(12) United States Patent
Clements

(10) Patent No.: US 11,907,421 B1
(45) Date of Patent: Feb. 20, 2024

(54) MIXED REALITY GLASSES OPERATING PUBLIC DEVICES WITH GAZE AND SECONDARY USER INPUT

(71) Applicant: Sigmund Lindsay Clements, Montreal (CA)

(72) Inventor: Sigmund Lindsay Clements, Montreal (CA)

(*) Notice: Subject to any disclaimer, the term of this patent is extended or adjusted under 35 U.S.C. 154(b) by 143 days.

(21) Appl. No.: 17/548,537

(22) Filed: Dec. 12, 2021

Related U.S. Application Data

(63) Continuation-in-part of application No. 16/246,503, filed on Jan. 13, 2019, now Pat. No. 11,221,680, which is a continuation-in-part of application No. 15/851,569, filed on Dec. 21, 2017, now abandoned, which is a continuation-in-part of application No. 14/634,788, filed on Feb. 28, 2015, now Pat. No. 10,691,397, which is a continuation-in-part of application No. 14/258,013, filed on Apr. 22, 2014, now Pat. No. 9,477,317.

(60) Provisional application No. 63/226,772, filed on Jul. 29, 2021, provisional application No. 63/159,491, filed on Mar. 11, 2021, provisional application No. 62/617,327, filed on Jan. 15, 2018, provisional application No. 62/483,954, filed on Apr. 11, 2017, provisional application No. 62/437,664, filed on Dec.

(Continued)

(51) Int. Cl.
| | |
|---|---|
| G06F 3/01 | (2006.01) |
| G06F 3/04817 | (2022.01) |
| G06F 3/0482 | (2013.01) |
| G06F 3/0484 | (2022.01) |
| G06F 3/16 | (2006.01) |

(52) U.S. Cl.
CPC .............. *G06F 3/013* (2013.01); *G06F 3/012* (2013.01); *G06F 3/015* (2013.01); *G06F 3/017* (2013.01); *G06F 3/0482* (2013.01); *G06F 3/0484* (2013.01); *G06F 3/04817* (2013.01); *G06F 3/167* (2013.01)

(58) Field of Classification Search
CPC .......... G06F 3/013; G06F 3/012; G06F 3/015; G06F 3/017; G06F 3/04817; G06F 3/0482; G06F 3/0484; G06F 3/167
See application file for complete search history.

(56) References Cited

U.S. PATENT DOCUMENTS 9,619,020 B2 * 4/2017 George-Svahn ........ G06F 3/013
10,095,033 B2 * 10/2018 Wang ...................... G06F 3/017

(Continued)

*Primary Examiner* — Michael C Zarroli

(57) ABSTRACT

An augmented reality headset, with an eye tracking device, and a secondary user input device, such as, a brain wave sensor detecting the user's brain waves, or a microphone detecting user made sounds, or finger recognition sensor, or facial recognition sensor detecting body gestures. When entering an elevator, the user views elevator input icons, displayed in mid-air. The user gazes at, an elevator floor icon, a cursor follows the gaze to the icon. The user thinks click, or says enter, or finger gestures, or facial gestures, and the icon is clicked. The clicked floor icon, directs the elevator, to move to the clicked floor. The input icons can be associated to activating, an internet web page, or a public device wirelessly connected to the glasses, like, a multi user door opener. The user avoids bacteria, that may be on the public door opener's physical control panel's touch input buttons.

19 Claims, 11 Drawing Sheets

Related U.S. Application Data

22, 2016, provisional application No. 61/946,789, filed on Mar. 1, 2014.

(56) References Cited

U.S. PATENT DOCUMENTS

| | | | |
|---|---|---|---|
| 2014/0184550 A1* | 7/2014 | Hennessey | G06F 3/041 345/173 |
| 2014/0336876 A1* | 11/2014 | Gieseke | G06F 3/012 345/156 |
| 2015/0009117 A1* | 1/2015 | Peters | G06F 3/013 345/156 |
| 2015/0145777 A1* | 5/2015 | He | G06V 10/141 348/78 |
| 2015/0261427 A1* | 9/2015 | Sasaki | G06F 3/0488 715/736 |
| 2016/0048211 A1* | 2/2016 | Raffle | G06F 3/013 715/863 |
| 2018/0260024 A1* | 9/2018 | Maltz | G02B 27/017 |
| 2019/0334619 A1* | 10/2019 | Aoyama | G06V 10/22 |
| 2020/0192625 A1* | 6/2020 | Vennström | G02B 27/00 |

* cited by examiner

MIXED REALITY GLASSES OPERATING PUBLIC DEVICES WITH GAZE AND SECONDARY USER INPUT

CROSS REFERENCE TO RELATED APPLICATIONS

This application claims the benefit of provisional patent application Ser. No. 63/226,772, filed 2021 Jul. 29, and Ser. No. 63/159,491, filed 2021 Mar. 11. This present application is a continuation in part of application number Ser. No. 16/246,503 filed 2019 Jan. 13, which is a continuation in part of application Ser. No. 15/851,569 filed 2017 Dec. 21, which is a continuation in part of application Ser. No. 14/634,788, filled 2015 Feb. 28, which is a continuation in part of application Ser. No. 14/258,013 filed 2014 Apr. 22, that claims the benefit of provisional patent application Ser. No. 61/946,789, filed 2014 Mar. 1, and naming Sigmund Clements as inventor. All the foregoing applications are hereby incorporated herein by reference in their entirety.

TECHNICAL FIELD

The present invention relates to mixed reality glasses, and user input devices, used to operate the glasses.

BACKGROUND OF THE EMBODIMENTS

Some displays, use gaze at an input icon, and continued gaze for a certain time period, to activate gazed at input icons.

Disadvantages (a) Bacteria on physical touch input buttons, can get on a user's fingers, by touching physical touch input buttons, of a multi user public device.
(b) Using only gaze to activate, an input icon by timing the amount of at an icon, may slow the input process for a user.
(c) Static electric sparks can be created by fingers, touching physical touch input buttons, this may ignite flammable material in a flammable environment.

What is needed is an improvement to the display, that activates the icons quickly, without a time period, by use of a secondary user input. Also having the display be mobile, that connects wirelessly to different multi user devices, and operates the devices.

SUMMARY OF THE EMBODIMENTS

The user avoids bacteria, that may be on public devices, such as, an elevator's physical control panel, by operating the panel with gaze, and secondary user inputs, into an augmented reality AR glasses. The glasses also allow, a wheel chair user, to operate the devices, hands free, or when they are out of arms reach.

A computer in the glasses, is connected, to an eye gaze detecting sensor, in the glasses. The computer connects to the glasses display, that shows input icons in mid air. The eye gaze sensor, detects the user's eyes gaze point location, on the icons.

A cursor is located at the eye gaze point, on the display. An icon is activated with the cursor, in contact with the input icon, and a detection of an input of from the user.

The user input can be either a sound, a finger gesture, a facial gesture, a brain wave thought. The computer is connected to either, a microphone, finger gesture recognition sensor, facial gesture recognition sensor, or a brain wave sensor The microphone, detects a specific sound, made by the user as a user input. The finger gesture recognition sensor, detects a specific finger gesture, made by the user as an input. The facial gesture recognition sensor, detects a specific facial gesture, made by the user as an input. The brain wave sensor, detects a specific brain wave thought, made by the user as a user input, these are secondary user inputs, with gaze being the primary input. The computer, has software to detect facial gestures, or finger gestures from images of finger gestures, or facial gestures, taken by the camera.

An example of a multi user device operation is, the glasses connect, to a vending machine. The display show input icons, that describe different operations, of the vending machine. Activation of one of the vending machine icons, with gaze, and secondary user input, is associated to activating the operation, of the vending machine, that the icon describes. The activated vending machine operation delivers, a vending machine product to the user.

Advantages

Advantages of an eye tracker in an AR headset, for using eye gaze to active input icons, displayed in mid-air are described.

(a) Input icons for a device, displayed in mid-air, are activated by gaze, and secondary user input, such as, brain wave thoughts, increasing ease of use.
(b) A user avoids touching bacteria on physical input buttons, by using gaze, and secondary user input, with mixed reality glasses.
(c) A wheel chair user's hands, don't need to be occupied by hand controllers, to input into the headset, and operate a device.
(d) Activation of input icons is almost instantaneous, with gaze, and secondary user input.

Public devices, connected to mixed reality glasses, with a gaze sensor, microphone, or brain wave sensor, or finger gesture recognition sensor, or facial gesture recognition sensor, which allows a user to operate a device, without touching the multi user devices physical input buttons is needed. Still further benefits of eye gaze, and secondary user input, to input AR headset displayed input icons, will become apparent from a study of the following description, and accompanying drawing.

BRIEF DESCRIPTION OF THE DRAWINGS-FIGURES

DRAWINGS REFERENCE NUMERALS

Figure 1:
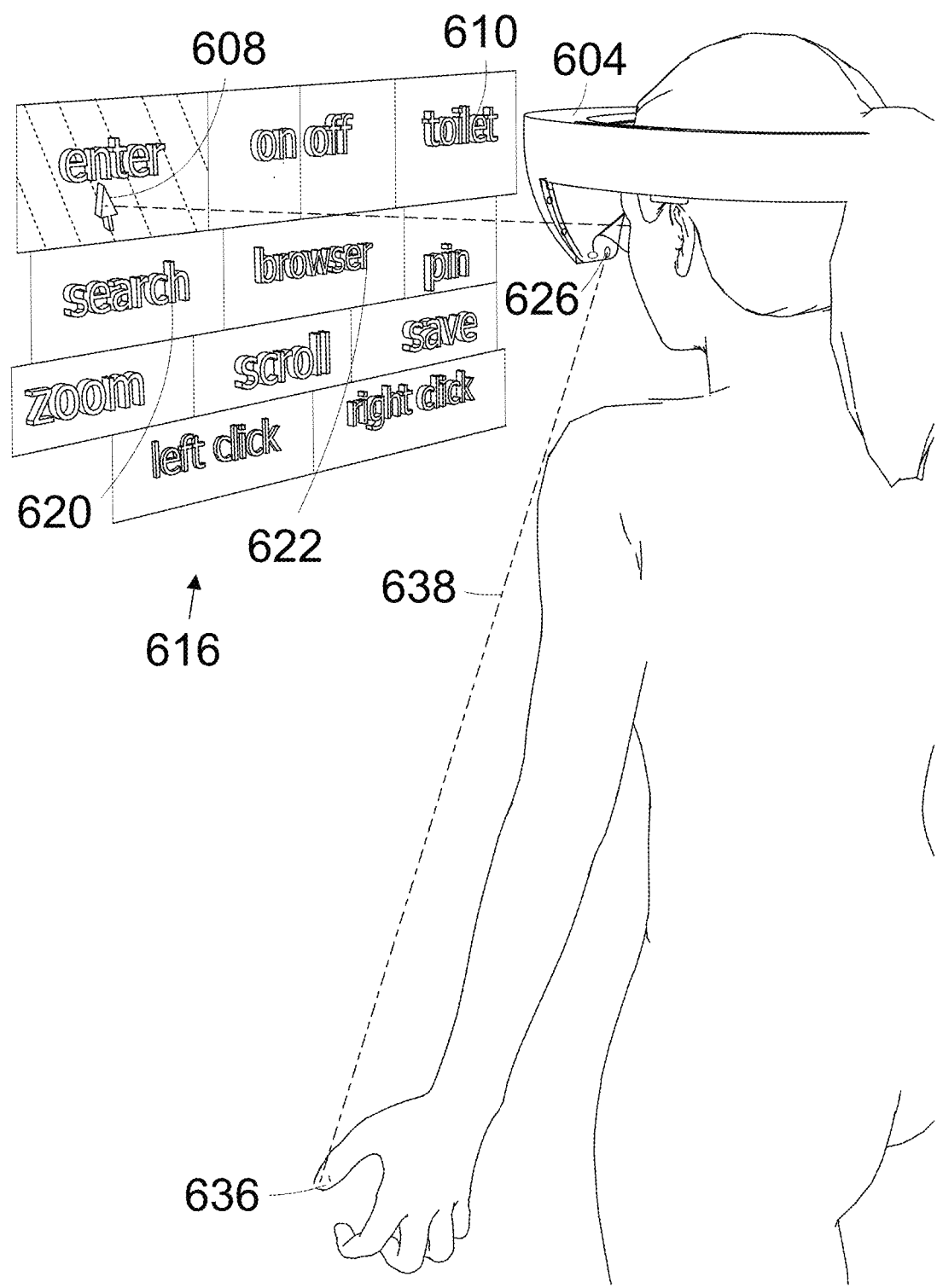
FIG. 1 shows a perspective view, of an augmented reality AR headset having an eye tracking device, brain wave sensor, or microphone and a computer command displayed in mid-air.

- 102 eye tracker, 104 augmented reality AR headset, 106 gaze, 110 input icon device function, 112 watch connected to glasses, 114 user, 116 input icons display, 118 cursor, 120 speech, 122 highlight, 124 on icon, 126 cell phone tower, 128 cell phone, 130 bidet's operating menu, 132 water pressure, 134 water temperature settings warm, 136 increase water pressure, decrease water pressure, 140 front wash, 142 back wash, 144 toilet, 148 medical device, 150 microwave cellular connection, 154 a WIFI connection, 156 local Area Network, 158 Bluetooth radio waves, 162 elevator, 164 internet, 168 router, 170 web page, 172 web page internet search, 176 microphone
- 602 eye tracking sensor, 604 AR headset, 606 eye gaze, 608 input icon computer function, 610 input icon device function, 612 input icon web page function, 614 user, 616 input icons display, enter input, 620 internet search operation, 622 browser, 624 facial gesture recognition camera, 626 finger gesture recognition camera, 628 facial gesture mouth closing from open, 630 brain wave sensor, 632 facial gesture recognition camera view of face, 634 microphone, 636 hand gesture, 638 hand gesture recognition camera view of hands
- 802 eye gaze point, 804 eye tracking display, 806 cursor, 810 self-driving car, 812 phone map, 814 phone, 816 user, 818 destination location search icon, 820 voice, 822 global positioning GPS map, 824 present location, 826 chosen route, 828 alternate possible route, 830 start travel icon, 832 stop travel icon, 834 desired destination location, 836 compass pointing north, 838 destination location search location search, 840 brain wave sensor, 842 mixed reality headset mr headset, 844 radio waves between glasses and phone, 846 eye gaze
- 902 glasses, 904 control panel, 906 physical elevator control panel, 908 elevator, 910 user, 912 cursor, 914 virtual elevator control panel commands, 916 user gaze, 918 hand gesture input, 920 gaze point, 922 thought brain wave sensor, 924 thought creating brain waves word click

DETAILED DESCRIPTION OF EMBODIMENTS

First Embodiment

Eye Tracker, Brain Wave Sensor, or Microphone Input Device in an Augmented Reality Headset Description An augmented reality AR headset, glasses, or a mixed reality MR headset, glasses, or a virtual reality VR headset, glasses, 604, have an eye tracking sensor 602, and brain wave sensor 630. The headset displays mid-air input icons, shown in FIGS. 1, and 2. The eye tracker in the headset, allows a user's eye gaze, to highlight the input icons, and the user's waves that activate the icon.

Detection of gaze by the gaze sensor, at the icon produces a visual change in the icon, such as, a highlight of the icon. Detection of specific thought, by the thought sensor, activates the highlighted icon, thought such as, click, or moving their tongue side to side.

Mixed reality glasses, have an eye tracking sensor, and brain wave sensor. The headset displays mid-air input icons. The eye tracker in the headset, allows a user's eye gaze, to highlight the input icons, and the user's waves that activate the icon.

Also, the user can say enter, and a microphone in the glasses, detects the word enter, said by the user. The detection of the enter word, instructs the computer to activate, the gazed at and highlighted icon. The microphone in the glasses, is positioned to detect words spoken by the user.

Detection of gaze by the gaze sensor, at the icon produces a visual change in the icon, such as, a highlight of the icon. Detection of specific thought, by the thought sensor, activates the highlighted icon, thought such as, click, or moving their tongue side to side.

Figure 2:
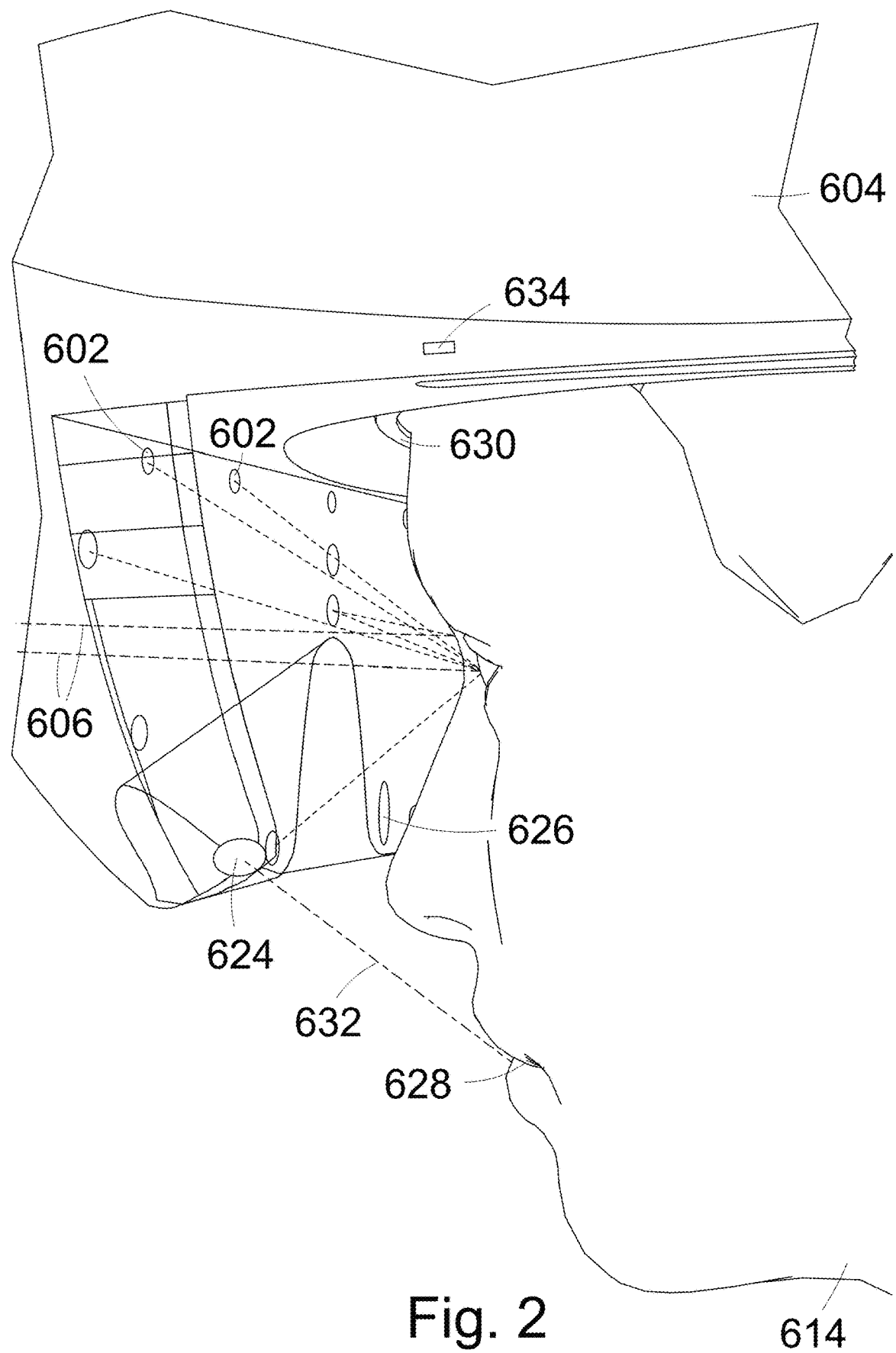
FIG. 2 shows a perspective view, of an eye tracking device, brain wave sensor, or microphone in an AR headset.

The eye tracking sensor, eye tracker 602, tracks a user's eye gaze 606, as they view their environment outside to the headset as shown in FIG. 2. The eye tracker is positioned in the headset, to view the user's eyes 614, when the user wears the headset. The user 614 views input icons 616, displayed three dimensionally 3D, in mid-air.

The eye tracker 602 connects to a computer, in the headset 604. The computer is programmed, with an eye tracking software.

The headset uses eye tracking, and eye gesture recognition, to operate the glasses external devices operating panel. The panel is displayed in mid-air. The glasses track the user's eye movements.

The Gazed at Icon is Highlighted

Gaze at an icon, highlights the icon. If the icon has a menu associated to it the gaze opens the menu, associated to the icon. Icons, or menu items of the menu are then gazed at, which highlights the items.

The headset 604 displays images, on glass lens that the user views. The images create an optical illusion for the user, that the input icons, menu items 616, are displayed three dimensionally, holographically, and or two dimensionally 2D, in mid-air, as shown in FIG. 1. The input icons are displayed, in the user's surroundings.

The display input icons stay pined, to their location in their environment. When the user moves the headset, the input icons don't move. The input icons can be set to move, with the movement of the headset, is the user desires.

Hardware

A computer is connected, to an eye gaze detecting sensor The eye gaze detecting sensor, detects the user's eyes gaze point location on the display. A cursor 118 is located at the eye gaze point, on the display.

The computer is connected to either, a microphone 634, finger gesture recognition sensor, facial gesture recognition sensor, or a brain wave sensor.

The microphone 634, detects a specific sound, made by the user as an input. The finger gesture recognition sensor, detects a specific finger gesture, made by the user as an input. The facial gesture recognition sensor, detects a specific facial gesture, made by the user as an input. The brain wave sensor, detects a specific brain wave thought, made by the user as an input.

For example, the computer is connected to a display. The computer is connected, to the self-serve store checkout payment station. The display show input icons, that each describe one of the different, operations of the self-serve store checkout station. Activation of an icon, is associated to activating the operation of the self-serve store checkout, that the icon describes.

An icon is activated with the cursor, in contact with the input icon and a detection of input of from the user. The area of the icon, can occupy the space around the icon, that is not visible as the icon, thought is highlighted when the cursor 912 is in the space, as in FIG. 9.

The user input can be either a sound, a finger gesture, a facial gesture, a brain wave thought. Gaze is continued at the input button, and thinks left click, or says yes, or moves a finger forward, or opens their mouth, button is activated. The icon can illuminate, when the cursor contacts the icon. The cursor over lays, is super imposed on the icon. The input button, can be an image that describes, the operation of the device that the button is associated to.

Hand Gesture Recognition Sensor

The input device is a hand gesture sensor 626, which can be a camera, an ultrasonic hand gesture detector, or a radar, that detects visual hand input of the user. The user input, is a hand gesture 636 input of the user. The hand gesture, finger gesture, inputs can include, is a thumb contacting an index finger, or a finger moving to a forward location, or a finger moving to a forward location then returning to its starting location, and a finger spinning in a circular motion.

The hand gesture sensor is connected to the computer. The camera is an electronic camera, video camera, that takes moving pictures that are analysed, by gesture recognition software that is install in the computer. The detection of a specific hand gesture is an associated to a yes, activation input, a left click of the icon.

The specific gesture to be detected, is preprogramed in the software, and the detected gesture can be changed by the user. Cameras in glasses that are positioned to view the user's hands, and fingers, when the user wears the glasses, on their face.

Facial Gesture Recognition Sensor

The input device is a facial gesture sensor 624, which can be a camera, an ultrasonic hand gesture detector, a radar, that detects visual facial input of the user. The user input is a facial gesture input of the user, the facial gesture is a mouth opening, or a smile.

Additional facial gestures 628 inputs can include, facial blink two eye lids closing and opening, wink one eye lid closing and opening, smile, mouth open, mouth closed, tongue stuck out of mouth.

The facial gesture sensor 624 is connected to the computer. The camera is an electronic camera, video camera, that takes moving pictures that are analysed, by facial gesture recognition software that is install in the computer. The detection of a specific facial gesture is an associated to a yes, activation input, a left click of the icon.

The finger gesture recognition camera 626, and the facial recognition camera, can be the same camera, or separate cameras, which that are positioned in the glasses to view 632, facial gestures or the user, and finger gestures, of the user. The camera, or cameras in glasses are positioned to view the user's face, mouth, eye lids, and or fingers 638.

The specific facial gesture to be detected, is preprogrammed in the software, and the detected facial gesture can be changed by the user.

Software

The voice recognition software, analyses words, or sounds detected by the microphone, to detect specific words or a sound that is associated to and enter command. When the specific word or sound is detected, the enter command is activated.

The brain wave recognition software, analyses words, or sounds detected by the brain wave sensor, to detect specific thought or thoughts that are associated to and enter command. When the specific word or sound is detected, the enter command is activated.

The finger recognition software, analyses finger gestures, detected by the finger recognition camera, to detect specific finger gesture or finger gestures that are associated to and enter command. When the finger gesture or finger gestures is detected, the enter command is activated.

The facial recognition software, analyses facial gestures, detected by the facial recognition camera, to detect specific facial gesture or facial gestures that are associated to and enter command. When the facial gesture or facial gestures is detected, the enter command is activated.

The Icons can Operate Different Functions,

The icons can operate different functions, such as, an internet operation 612, a device operation 610, or computer operation 608, as shown in FIG. 1. A browser input icon 622 is used in internet operations, to display a search web page.

Input icons are displayed on the displayed web page, such as, an internet search operation icon 620. The search operation, is used to search 620 the internet. The user types into the search operation type box, information requested by the user, and activates the search operation icon. The results of the search, are displayed on the display.

The icons show computer functions 608, such as, an 'enter' input 618, or command. The icons show device functions 610, such as, a 'toilet' icon, which is used as part of an electronic bidet in a toilet.

User Input to Activate Highlighted Icons

Any sound the user makes on purpose, can be associated to an enter instruction for the highlighted icon, such as, clicking sound made by moving their tongue from contact with the roof of their mouth way from the roof, or a popping sound by moving their lips a part quickly, or their fingers tapping their clothes, or a short vocalization, like, saying the letter, h, or user input sound, can be rustling of keys, click of the tongue, exhalation sound, inhalation, and hands clapping.

Any thought the user makes on purpose, can be associated to an enter instruction for the highlighted icon thoughts could be used, associated to the click, activation of the highlighted icon, like, thinking the color blue, or imagining an image of a potato, the letter f, a song like, Beethoven's 5th symphony, an emotion, like, happy, the sensor detects the brain waves of the though, and the detected waves are interpreted as a click of the icon, the interpreted icon click sends an icon click to the glasses computer, the received click command is done, and the icon is clicked.

A portable ElectroEncephaloGraphy EEG system, integrating imperceptible microneedle electrodes with soft wireless circuits can be used. The system uses a motor imagery-based, wearable brain-machine interface BMI system. The brain-machine interface, uses imagined motor actions, as inputs, such as, grasping with either hand, which frees the subject from having to look at too much stimuli.

User Choosing Sound they want to Activate the Icon

The sound associated to activating the highlighted icon can be changed by the user, by opening a sound association menu, and making the sound they want to associate. Recoding the sound, and choosing to associate the recorded sound, to activating the highlighted icon. When an icon is highlighted, the computer will listen for sound thru the microphone, and a sound similar to the stored recorded sound, will be an instruction the computer, to activate the icon.

The brain waves associated to activating the highlighted icon can be changed by the user, by opening a brain waves association menu, and making the brain waves, or thought they want to associate. Recoding the thought, and choosing to associate the recorded thought, to activating the highlighted icon. When an icon is highlighted, the computer will detect brain waves for thought thru the brain wave sensor, and a thought similar to the stored recorded thought, will be an instruction the computer, to activate the icon.

Though detected by the brain wave sensor, can be used, like, thinking the letter a, or click, or picturing a tree, or a color, blue, or yes, using the quickest and least energy efficient thought, moving their tongue Artificial intelligence in the computer may learn to detect the associated enter thought, of the user faster, so the thought is detected, and activates the highlighted icon faster. As the artificial intelligence practices, learns how to faster detect, or analyse the brain waves associated to the thought. Though may be needed to be held for a specific time period for the sensor to detect it, like, 0.8 seconds, as the sensor gets better at detecting the thought, the time of detection may decrease to 0.4 seconds, to being almost instantaneous detection of the thought.

Ai is used to improve the glasses interaction with the user, by learning the how to detect the user inputs, like, words, gestures, and thoughts, and how the user interacts with devices, to speed up the interaction, by predicting use from past use. Ai enables machines to communicate with humans in human natural language patterns, and for machines to communicate back to humans in the language they understand. The conversational pattern of AI can be seen in machine ability to understand sentiment, mood, and intent, or take visual gestures and translate them into machine understandable forms.

An icon is a pictogram or ideogram displayed on a computer screen in order to help the user navigate a computer system. A drawing of a brain indicating a thought will active the icon. The right click opens a menu, with commands, like, cut, copy, paste, search, font, font size, print save, save as, and translate to English.

The icons can operate different functions, such as, an internet operation, a device operation, or computer operation. The browser input icon 180 is used in internet operations, to display a web page 170, in FIG. 6. Input icons are displayed on the displayed web page 170, such as, an internet search operation 172.

Headset Functions

Headset Functions can, include a display a brightness control. The brightness control can be displayed as a line, that the user looks at. Locations on the lie are associated to a percentage of the brightness of the display. The brightness percentage is from 0 to 100 percent. A change in a percentage of brightness increases or decreases the brightness from its present setting. An icon on the line graphically displays the brightness percentage A sliding icon on the line can also be used, to adjust the brightness to the display. The sliding icon shows the brightness percentage. The user gazes at the sliding icon, to activate it. The activated sliding icon, follows the user's gaze location. If the gaze is above the sliding icon the sliding icon moves up, and vice a versa. Move of the sliding icon up this increases a sound of the headset, or below the icon decrease the sound.

The sliding icon can be used for display size, to increase, or decrease its size. The size of the display can be increased or decreased.

The Display

A map is part of the headset, with the locations of the headset, and device shown on it. The map is displayed on the headset display, with the locations, of the headset, and device. The map displays the relationship of the location of the headset to the device, and distance.

When the headset, and device are at a distance on the map, the device, and headset connect with each other through the internet. The device sends its virtual control panel to the headset. The control panel is displayed by the headset.

The user operates the device, by inputting into the control panel. The inputs into the control panel, are sent to the device. The device uses the received inputs into its control panel, to effect, influence the operation of the device. The influenced operation of the device is sent to the headset. The headset displays the influenced operation of the device.

For example, the user is close to an automated teller machine ATM. An icon is displayed that the ATM can be operated. The ATM icon is activated. The ATM control panel is displayed on the display. The control panel displays inputs, such as, deposit, withdrawal, a 1-10 number pad, enter, change, and cancel, etc.

The user inputs a deposit input, using eye gaze, at the input icon, and thinks left click, or says yes, or moves a finger forward, or opens their mouth, the input icon is activated. The deposit screen is displayed. Eye gaze inputs 11.00, by looking, at the numbers 1100 on the number pad consecutively. Eye gaze, and secondary user input, activates the enter input. The 11.00 of currency is deposited, and accepted by the ATM, and the acceptance is displayed by the headset. The user ends the session with the ATM, by using eye gaze, at a log out, and thinking a thought, or saying enter, or moves a finger forward, or opens their mouth, to activate the log out input.

Manual Connection to a Device by Headset

The headset connects to the device, thru the device's web page. The device's location is shown on the map, with an icon representing the device. A name, or description, which describes the device's icon, such as, smart toilet, or elevator.

The icon is activated by eye gaze, and secondary user input. The activated icon shows an icon window. On the icon window is displayed an internet link to the device's control panel. The window can give more information about the device, such as, how many users are using the device. and user reviews about the device.

The link is described as, the devices control panel. The link is activated, and the control panel for the device is displayed. The control panel show different imputable operations for the device, with input icons. The user operates the device, by activating the input icons, with eye gaze, and secondary user input.

The link is connected an internet address for the device. The device's internet address, is managed by the server 168 that the device is connected to. The device connects to a router. The router connects to the server that its specific to the device. The devices web page is managed, and or stored on the device's computer, or the device's server. Information from the device is sent to the headset, and information from the headset is sent to the device.

The web page gives visual feedback, on how the activated functions of the device, influences the operation of the device. The headset receives, and displays the feedback, from the device, concerning the influence the activated device operation, has had on the device.

The Device Icons are Short Cuts to the Device Control Panel

The device icons are short cuts to the device control panel. The device short cut is linked to an internet link for the device control panel. The activation of the device icon, opens the control panel for the device, and displays the it, without showing the link of the device in a window.

Down Loading the Devices Control Panel and Operating the Device with Bluetooth Radio Waves The device's web link is activated. The devices control panel is downloaded to the headset. The downloaded control panel is displayed with an input icon short cut to the control panel. The icon visually identifies, that it is an icon for the device. The icon is activated, and the control panel is displayed. The headset connects to the device using Bluetooth radio. The user activates the device's control panel input icons using eye gaze. The activated icon operates the device.

Single Network for the Devices, and Manual Connection

The devices use a single network. The manual connection procedure of the headset, to devices can be used. The devices connect to the headset, on servers of a single network, that can be operated by a company. The devices are connected to the network's servers 168. The network displays the map web page. The devices web pages, and devices information are stored on the network's servers.

The headset connects to the network map, and devices over the internet. The headset operates the devices by communicating with the devices thru the network's servers.

Map Search for Devices

The user can zoom into and out of the map. The map is a graphic representation of the area, with written descriptions, such as, streets, street names, buildings, names of points of interest, like, parks, stores, restaurants, metro stations. The map can be a picture view, such as, internet street view, that shows 3D picture views of the street, of the user's headset, and devices locations.

Devices Shown on the Map

Device that can be operated by the headset are shows at their locations, on the map, such as, elevators, and store checkout pay machines.

The map can be searched for devices, with a search map engine. The user can search for devices on the map, such as, smart toilets, gas station gas pumps, with the search results shown at their locations on the map.

The server that the headset is connected to, connects to the server that the device is connected to. The device, and headset communicate thru the connected servers.

The device can limit the distance that the device can be operated, such as, 20 meters. If more than one user is using a single user device, for instance, an ATM, the first user uses the device. The users are assigned a number in line, each user shown the number, of their location in the line to use the ATM, such as, number 3.

If the device is a multiuser operated device, like, an elevator, the first users' input, effects the operation of the elevator. The first user to input a floor number, is inputted, then the next detected user to input floor number, so the detected inputted floor numbers are recorded, and displayed consecutively.

Finding the Device by Viewing the Device's Location on the Map

The headset has a global positioning system GPS, and the device has a GPS. The position of the headset, and device plotted on a map on the server, such as, an internet map. The map determines the distance from the headset, to the device.

The user finds the device, by viewing the device's, and headset's location on the map. The map can be an internet map that shows streets, and buildings, and environmental information. The user can move to the device, and view the headset's icon's location moving, in real time on the map. The user can view their progress toward the device, as the map updates the headset's location on the map.

The AR glasses, have a route software, which augments reality, by showing a line, route that is displayed on the environment, and viewable by the user. The line is followed to reach the device. The route is pinned to the environment, as the user walks, drives an automobile, or cycles a bicycle, motorcycle, or self-driving car.

The route in the environment, is the same as the map route, and follows the route, that is displayed on the map. The user can follow the route line to reach the device's destination.

Devices can be shown such as, elevators, vending machines, and store checkout payment stations. Each device is connected, to one of many servers. Each server is connected to the internet. Each device has an internet address, that is unique to the device. Each device has a web page that is specific to that device. The web page for one of the device's, displays the devices control panel. The page is interactive with the user. The user can operate the device, by eye gaze, and secondary user input, activating commands for functions of the device on the web page.

Headset Connected to the Internet, by Connecting to a Phone Connected to the Internet The headset can connect to the internet, by connecting to a phone. The headset connects to the phone using Bluetooth radio waves, or wifi, or infrared light. The phone connects to a cell phone tower. The cell phone tower network connects to the internet. This allows for the headset to use lower energy Bluetooth radio waves, to connect to the internet, which may be safer for the head of the user, by keeping the higher energy waves away from the head.

The headset connects to the internet, by connecting to a cell phone tower, which is connected to a phone internet server, with the cell phone tower network connected to the internet.

The headset, and or device, or both broadcasts, on their respective servers, over the internet, their availability to connect with each other. The headset broadcasts, it's availability to connect to the device, and the device it's availability to connect to the headset.

Eye Tracker Input Device in an Augmented Reality Headset Operation

Detection of gaze by the gaze sensor, at the icon produces a visual change in the icon, such as, a highlight of the icon. Detection of specific thought, by the thought sensor, activates the highlighted icon, thought such as, click, or moving their tongue side to side, or the microphone detecting the enter word being said, or moving a finger forward, or opens their mouth, activates the icon.

The eye tracker 602 detects where the user's 614 gaze 606 is directed, looking. The eye tracker detects, when the user gazes at one of the icons 616, as shown in FIG. 2. Secondary user input of the display input icon, refers to the secondary user input that includes, thought brain waves, or spoken words, or hand gesture input, or facial gesture input.

For example, the user gazes, at the enter input 618, as shown in FIG. 1. The user thinks enter, the enter input is activated, or the word enter is said or moving a finger forward, or opens their mouth, activates the icon. The activated enter input is used, to enter a computer input, for the headset, or web page, or device.

A signal that the icon has activated, is sent to the device, to operate a function of the device. The device receives the signal to operate the function of the device. The device uses the received function signal to operate the device.

The headset 604 receives, and displays feedback, from the computer 604 in the headset, concerning the influence the activated computer function, has had on the headset computer.

The headset receives, and displays feedback, from a computer in the device, concerning the influence the activated device function, has had on the device.

Alternative Embodiments

Visual Feedback of Eye Tracker Input Device in an Ar Headset Description

Mixed reality glasses, have an eye tracking sensor, brain wave sensor, and microphone, finger recognition sensor, and facial recognition sensor. The headset displays mid-air input icons. The eye tracker in the headset, allows a user's eye gaze, to highlight the input icons, and the user's waves that activate the icon.

Detection of gaze by the gaze sensor, at the icon produces a visual change in the icon, such as, a highlight of the icon. Detection of specific thought, by the thought sensor, activates the highlighted icon, thought such as, click, or moving their tongue side to side.

Also, the user can say enter, and a microphone in the glasses, detects the word enter, said by the user. The detection of the enter word, instructs the computer to activate, the gazed at and highlighted icon.

Figure 3:
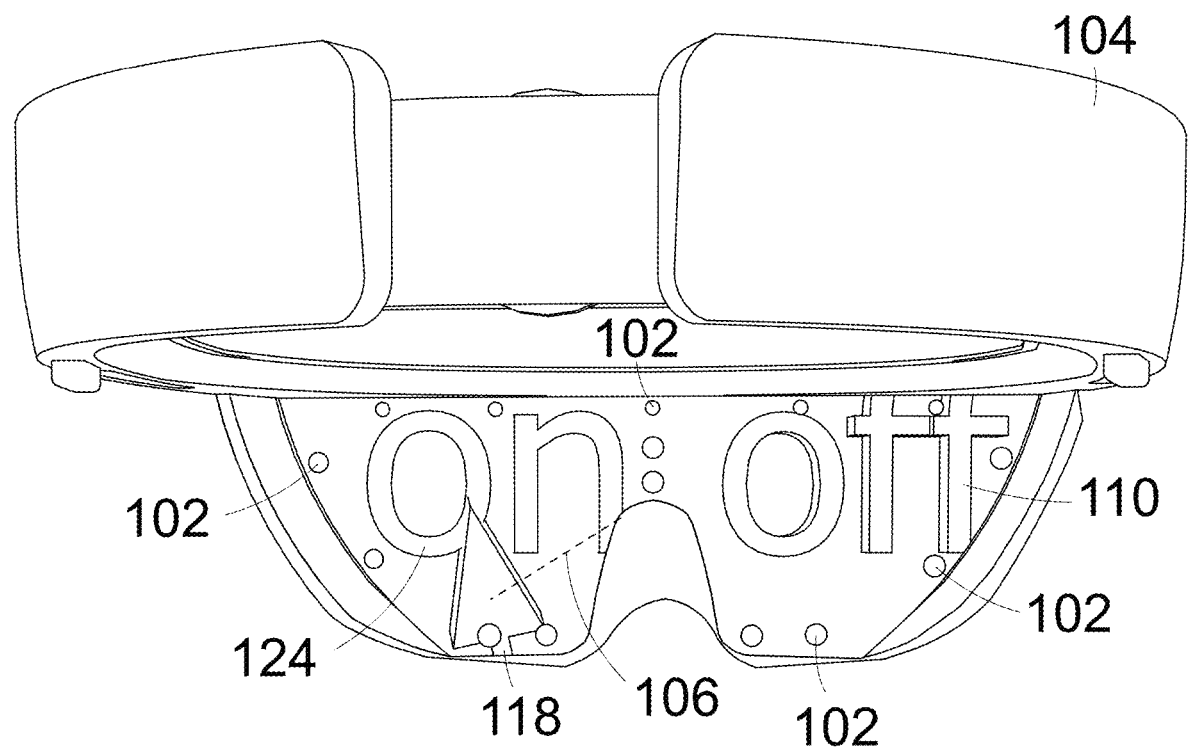
FIG. 3 shows a perspective view, of an eye tracking device, and secondary input devices in an AR headset.
Figure 4:
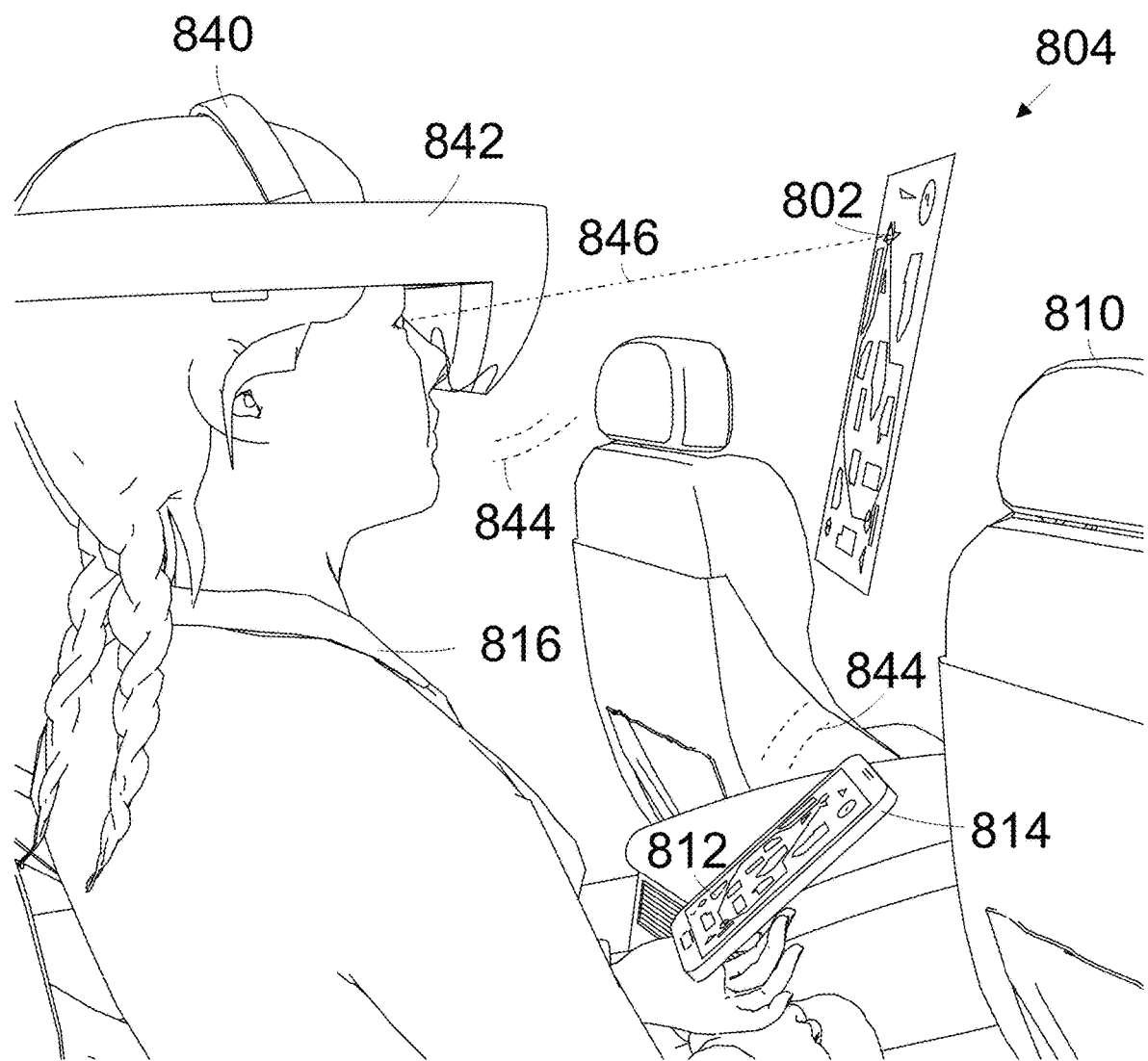
FIG. 4 shows a perspective view, of an eye tracking device, secondary input devices in an AR headset, used to operate a car.

An augmented reality headset 104 uses an eye tracking sensor 102, to track a user's eye gaze 106, as shown in FIGS. 3, and 4. The eye tracker is positioned in the headset, to view the user's eyes 114, as the user 114 views input icons 116, displayed three dimensionally 3D, in mid-air.

The eye tracker 102 connects to a computer in the headset 104. The computer is programmed, with eye tracking software.

Figure 5:
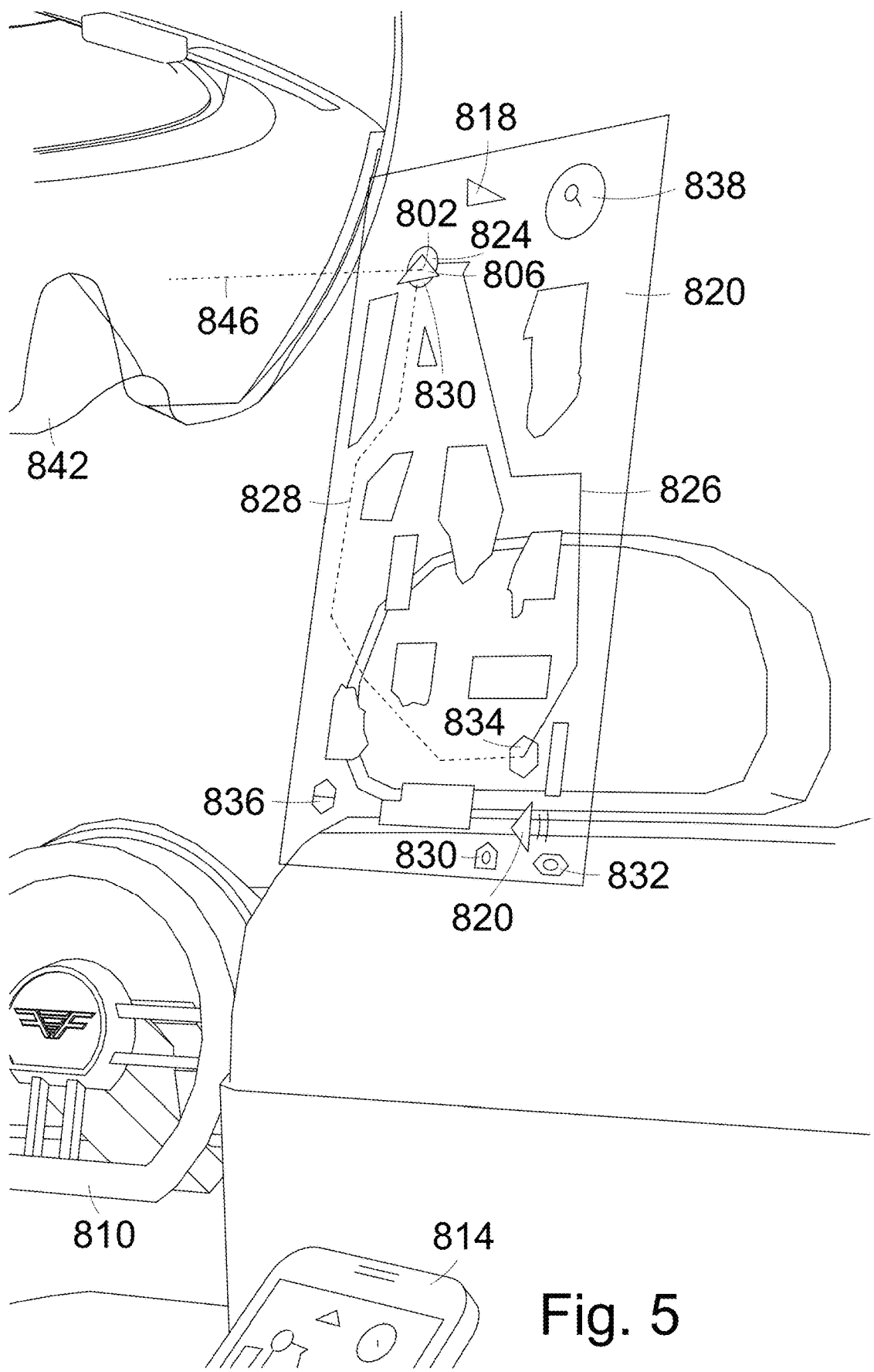
FIG. 5 shows a close-up perspective view, of an eye tracking device, secondary input devices in an AR headset, used to operate a car.

The headset, augmented reality portable computer 104 displays images, on glass lens that the user views. The images create an optical illusion for the user, that the input icons 116, menu items, control panel, graphical user interface, are displayed three dimensionally, holographically, and or two dimensionally 2D, in mid-air, as shown in FIGS. 3, and 5. The input icons are displayed, in the user's surroundings. The cursor can be turned off so that it isn't displayed. The icons that are gazed at can be highlighted.

The Icons can Operate Different Functions

Figure 6:
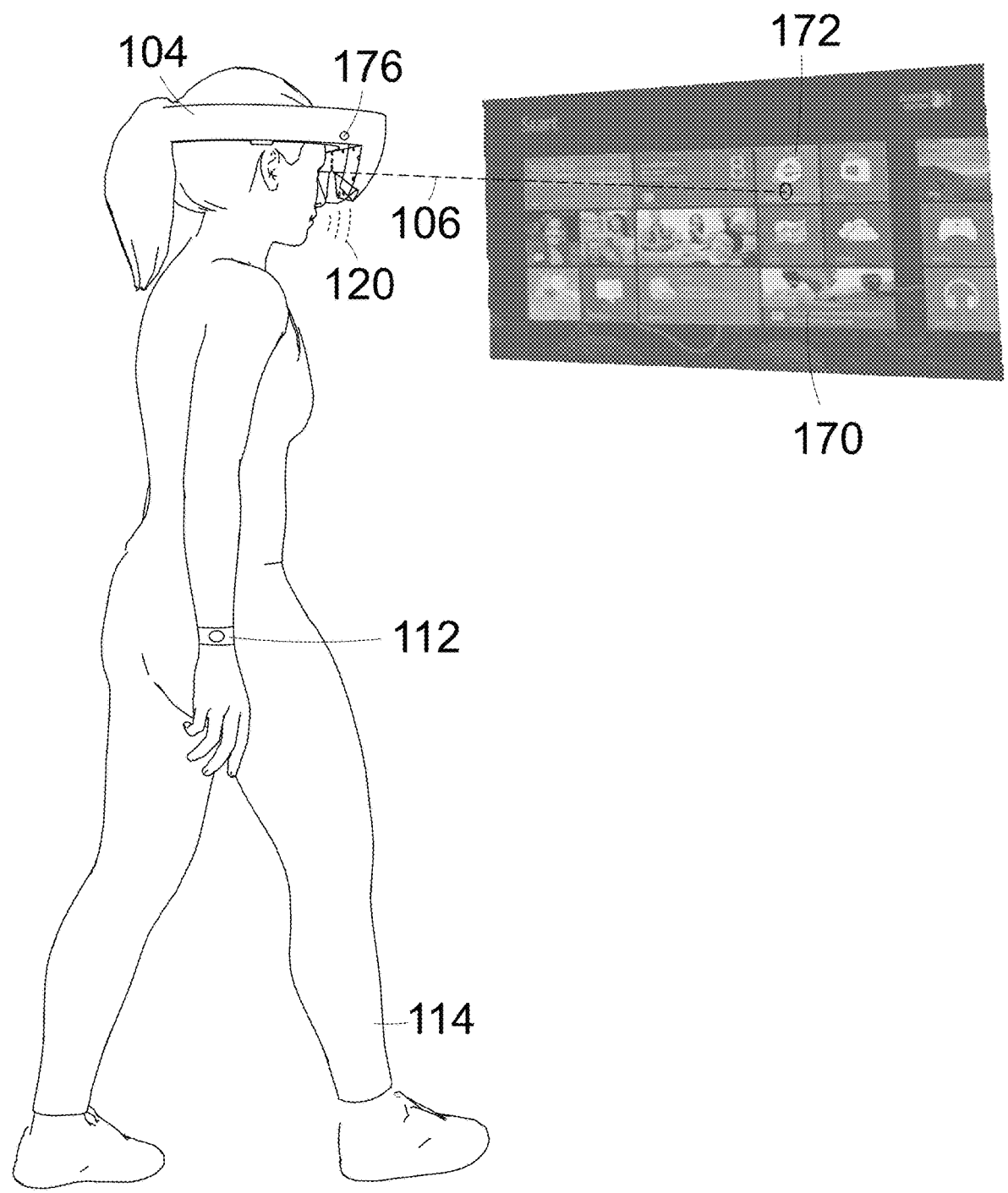
FIG. 6 shows a perspective view, of an in an AR headset with an eye tracking device, secondary input devices and input web page displayed in mid-air.

The icons can operate different functions, such as, an internet operation, a device operation, or computer operation, etc, shown in FIGS. 4 and 6. The browser input icon is used in internet operations, to display a web page 170, in FIG. 6. Input icons are displayed on the displayed web page 170, such as, an internet search operation 172.

The icons show computer functions, such as, an enter command. The icons show device functions 110, such as, an cony icon 124, which is used as part of a light switch, to turn on a light, in FIG. 3.

A signal that the icon has activated, is sent to the device, to operate a function of the device. The device receives the signal to operate the function of the device. The device uses the received function signal, to operate the device.

The headset 104 receives, and displays feedback, from the computer 104 in the headset, concerning the influence the activated computer function, has had on the headset computer.

The headset 104 receives, and displays feedback, from a device computer 104 in the device, concerning the influence the activated device function has had on the device.

Operation of a Public Multi User on Off Switch

For example, the eye tracker 102 detects the user's gaze at the light's, public multi user on off switch, on icon. The cursor moves to, and is superimposed on, the on icon. The on icon with cursor is highlighted 122. The user thinks enter, the icon is entered, the icon with the cursor on it is entered.

The on icon 124, is inputted by the detection of the user's gaze 106, at the on icon, the icon is highlighted. The user thinks enter, or the word enter is said, and the highlighted icon is entered. The light is turned on, by the input of the on icon. The headset receives information that the light has turned on. The headset displays that the light, has turned on.

Connection Between Headset and Devices

Figure 7:
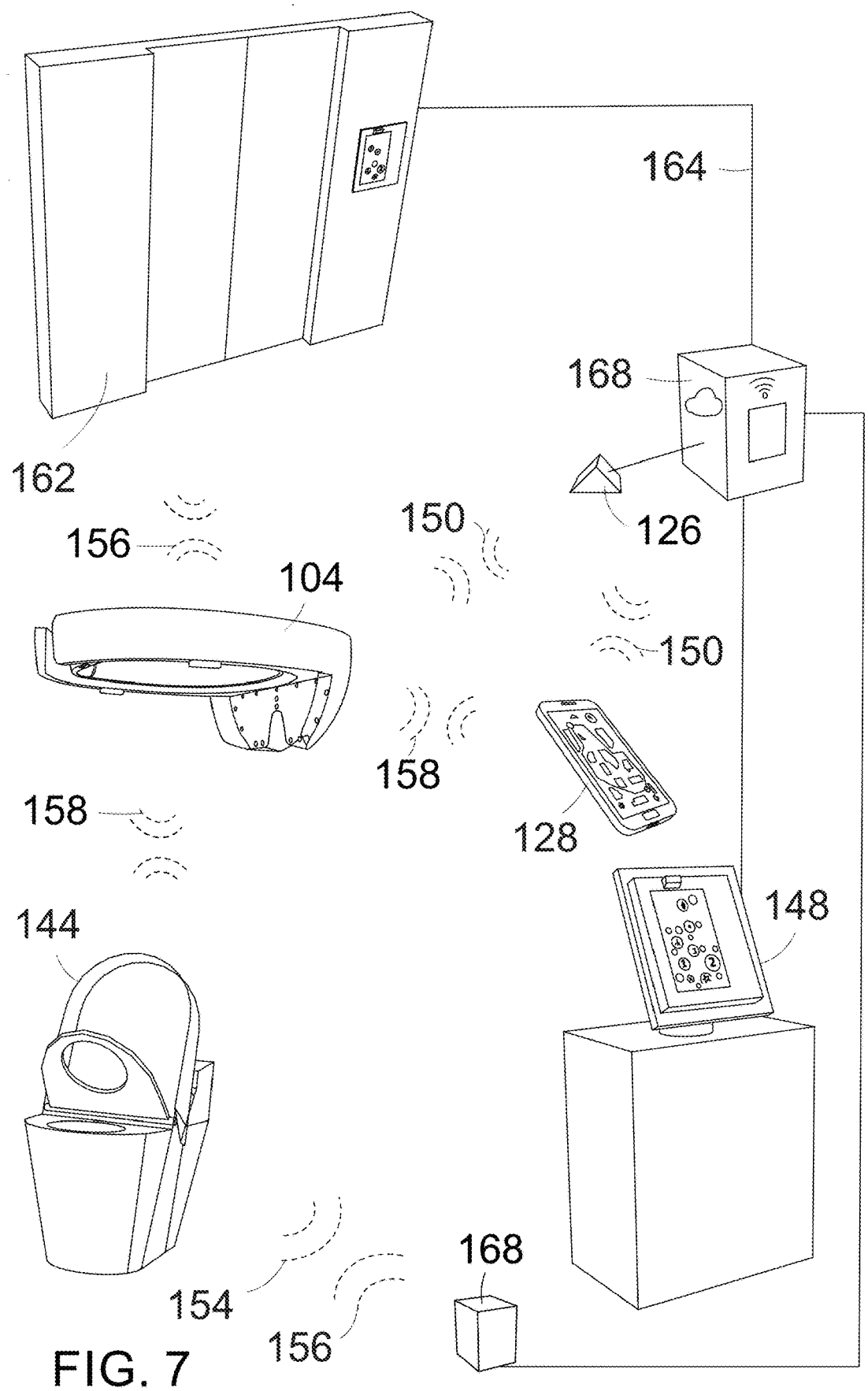
FIG. 7 shows a perspective view, of an AR headset with an eye tracking device, secondary input devices, wirelessly connected to different devices, or wirelessly connected thru the internet.

The headset may connect to and communicate to differing external devices, as illustrated in FIG. 7. The headset uses a radio wave connection between the headset and the differing devices, and or an internet connection between the headset and the differing devices.

The headset can connect to devices, with the headset having a wireless connection to the internet, which can include, microwave cellular connection 150, to cellular towers 126, a WIFI connection 154 over a local Area Network (LAN) 156, Direct WIFI, Infrared light, and Bluetooth radio waves 158. The headset having radio wave transmitters, and receivers for each radio connection system.

The headset can connect to the internet, thru a WIFI router 168. With the headset router being is connected a server, which is connected to the internet.

The devices can connect to the internet, thru a router 168, and modem. The device router being connected a server, which is connected to the internet. The devices can use a wireless, WIFI, or wired connection to the router.

The headset can connect to a smart phone, cell phone 128, using Bluetooth radio waves 158, in FIG. 7. The phone connected to the headset, can connect to cell phone towers 126 using cell phone radio waves, or microwaves 150. The headset can access the internet, thru the phone's connection, to the cell phone towers.

The devices that connect the headset 104 can connect to the headset having a wireless or wired connection to the internet, which can include, microwave cellular connection, to cellular towers, a WIFI connection over a local Area Network (LAN), Direct WIFI, Infrared light, and Bluetooth radio waves. The headset having radio wave transmitters and receivers for each radio connection system. The devices, may include an elevator 162, the smart toilet 144, and a medical device 148.

Establishing a Connection Between Headset and Devices

The headset broadcasts that's its available for communication with a device, as illustrated in FIG. 7. The headset searches for devices that are broadcasting, that they are available to communicate with the headset.

The device broadcast that's its available, for communication with the headset, and searches for headsets that are broadcasting that they are available with the headset. When the headset, and device are in radio wave connection range with each other, they connect, and communicate with each other.

External devices broadcast their control panels, to different headsets. More than one headset can operate a device, such as, many user's headsets can input into the elevator control panel, at the same time.

When the user's headset, is in the vicinity of the external device. The external device's control panel icon, is shown on the headset's display. The control panel icon, indicates that the external device's control panel, it's available for downloaded to the headset computer.

When the external devices control panel is activated, the external device's control panel is download, to the headset's computer, and is shown on the headset display An Internet Connection Between the Headset and Device The headset can connect to external devices using the internet 164, as illustrated in FIG. 7. The device broadcasts over the internet that its available for operation.

The headset computer's location can be found using the headset's global positioning system GPS, or headset cell phone location, etc. The headset can be located on an internet map. The map includes, the external devices locations on the map. The devices, such as, a vending machine can communicate with the headset, connecting with headset using an internet connection, using internet communication, and communicating over the internet.

The headset can be located on the map. The map shows the plotted locations, of the different external devices locations. The headset, and devices each has a location software that allows them to know each other's location on the internet map.

The headset's computer, and external devices location can be tracked and plotted, on the internet map, to determine when the headset is in the vicinity of the devices. The map is displayed, and viewed by the user Storage The computer readable medium may include non-transitory computer readable medium, for example, such as computer-readable media that stores data for short periods of time like register memory, processor cache and Random-Access Memory (RAM). The computer readable medium may also include non-transitory media, such as secondary or persistent long-term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

These computer program instructions may also be stored in a computer-readable medium that can direct a computer or other programmable data processing apparatus, to function in a particular manner, such that the instructions stored in the computer-readable medium produce a function of a device, including instructions which implement the function act specified in the flowchart and or block diagram block or blocks.

The computer program instructions may also be loaded onto a computer, or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram.

Computer

The computer in the external device, is used for processing, and implementing the information received from the headset, concerning the user's operation, and input of the device's operating menu on the headset. The received user input information, by the external device, is used in the operation of the external device.

The computer may further include on-board data storage, such as memory coupled to the processor. The memory may store software that can be accessed, and executed by the processor, for example. The host may be any type of headset computing device, that is configured to transmit data to the device. The host and the device may contain hardware, to enable the communication link, such as processors, transmitters, receivers, antennas, etc.

Communication Links

The headset may connect to the device, locally, over a network, or at a distant location over the internet. In the communication link is illustrated as a wired connection, however wireless connections may also be used. For example, the communication link may be a wired link via a serial bus such as USB, or a parallel bus.

A wired connection may be a proprietary connection as well. The communication link may also be a wireless connection, such as Bluetooth, IEEE 802.11 or other wireless based communication links. In another example, the system includes an access point through which the device may communicate with the internet. In this example, the device may not require connectivity to the host.

The access point may take various forms. For example, if the device connects using 802.11 or via an Ethernet connection, the access point may take the form of a wireless access point (WAP) or wireless router 168, that connects to a server 168 thru the internet. As another example, if the device connects using a cellular air-interface protocol, such as a CDMA or GSM protocol, the access point may be a base station in a cellular network, that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, GPRS, CDMA, EV-DO, and/or HSPDA, among others.

Furthermore, the device may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internet through the host.

Headset Connecting to the Devices Through the Internet

The headset can communicate with the device through the internet. The headset having a cell phone transmitter and receiver, for connecting to a cell phone tower, and cell phone network. The phone network connects to a phone network server 168.

The device connects to an internet router, either wirelessly, or wired. The device router, connects to a device server 168, on the internet.

The phone network server and device server connected to each other over the internet. The headset, and device each have a, compatible communication software. The headset connects to the device, over the internet. The headset, and device each have unique internet net addresses, that are used to find each other, and connect to each other.

The Headset has a Global Positioning System GPS

The headset has a global positioning system GPS, and the device has a GPS. The position of the headset, and device are plotted on a map on the server, such as, an internet map. The map determines the distance from the headset, to the device.

The headset, and or device, or both broadcasts, on their servers, their availability to connect with each other. The headset broadcasts that's it's available to connect to the device, and the device being available to connect to the headset.

When the headset, and device are at a distance on the map, the device, and headset connect with each other through the server. The device sends its virtual control panel to the headset. The control panel is displayed. The user operates the device, by inputting into the control panel. The inputs into the control panel, are sent to the device.

The device uses the received inputs into its control panel, to effect, influence the operation of the device. The influenced operation of the device, is sent to the headset. The headset displays the influenced operation of the device.

Many Devices Control Panels Displayed by Headset

Many different external devices software, can be download to the headset's computer. Each devices software containing software for the devices control panel. The different devices, which are available to be operated, can be shown on the display. The user can input, which device they choose to operate.

Headset can Connect to Many Devices Simultaneously

The headset can operate more than one device at a time. Two devices operating menus, can be shown on the display, at the same time. The user can input into the operating menus consecutively, such as, the user can operate a vending machine, then operate the room lights.

Programming

Computer program code for carrying out operations of the object detection, and selection mechanism may be written in any combination of one or more programming languages, including an object-oriented programming language such as Java, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server 168. In the latter scenario, the remote computer may be connected to the computer through any type of network, including a local area network (LAN) or a wide area network (WAN), or the connection may be made to an external computer (for example, through the Internet using an Internet Service Provider).

Software

The headset and device use a compatible software language, a standardized software language, a communication software language to communicate with each other. The device and headset each have a respective computer, with a microprocessor connected to a storage. The computer in the headset is used for processing, the operation of the downloaded device control panel.

The headset, and external devices, have the computer communication software, that allows them to communicate and operate, with each other. The software allows for the transference, download of operating panel displays, from the external devices to the headset.

Operation Flowchart

Figure 11:
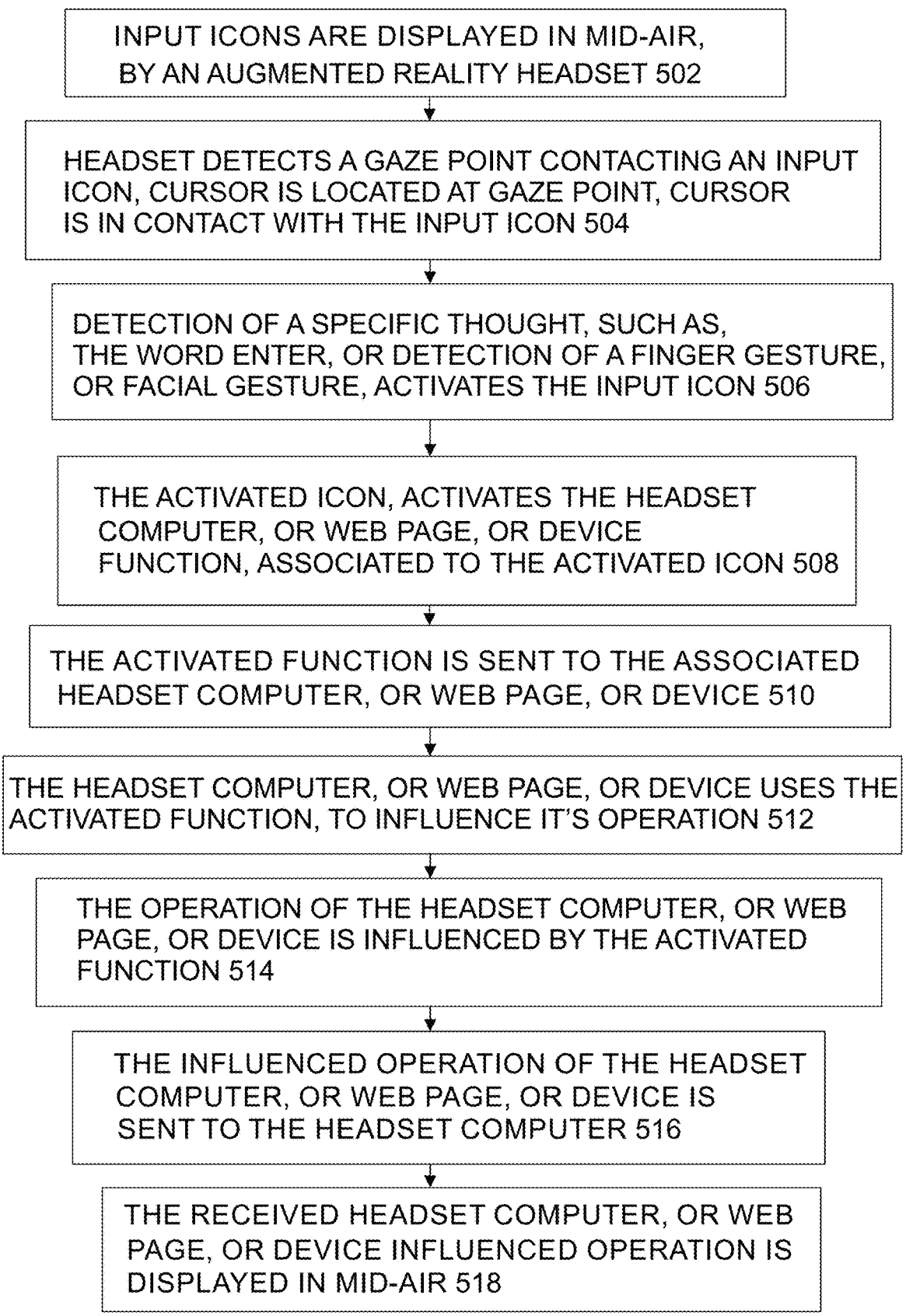
FIG. 11 depicts a software flowchart, of a user's operation of an eye tracking device, secondary input devices in an AR headset, connected to multi user external devices.

The object detection and selection mechanism are described below with reference to flowchart illustrations and or block diagrams of methods, apparatus (systems) and computer program products according to implementations thereof. It will be understood that each block of the flowchart illustrations, in FIG. 11, and or block diagrams, and combinations of blocks in the flowchart illustrations and/or block diagrams, can be implemented or supported by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive Operation Flowchart A software flow chart, of gaze detected by the eye tracker used for activating input icons, is described in FIG. 11, input icons are displayed in mid-air, by an augmented reality headset 502, headset detects a gaze point contacting an input icon, cursor is located at gaze point, cursor is in contact with the input icon 504, detection of a specific thought, such as, the word enter, or detection of a finger gesture, or facial gesture, activates the input icon 506, the activated icon, activates the headset computer, or web page, or device function, associated to the activated icon 508, the activated function is sent to the associated headset computer, or web page, or device 510, the headset computer, or web page, or device uses the activated function, to influence it's operation 512, the operation of the headset computer, or webpage, or device is influenced by the activated function 514, the influenced operation of the headset computer, or web page, or device is sent to the headset computer 516, the received headset computer, or web page, or device influenced operation is displayed in mid-air 518.

Block Diagram of Connected Components

Figure 10:
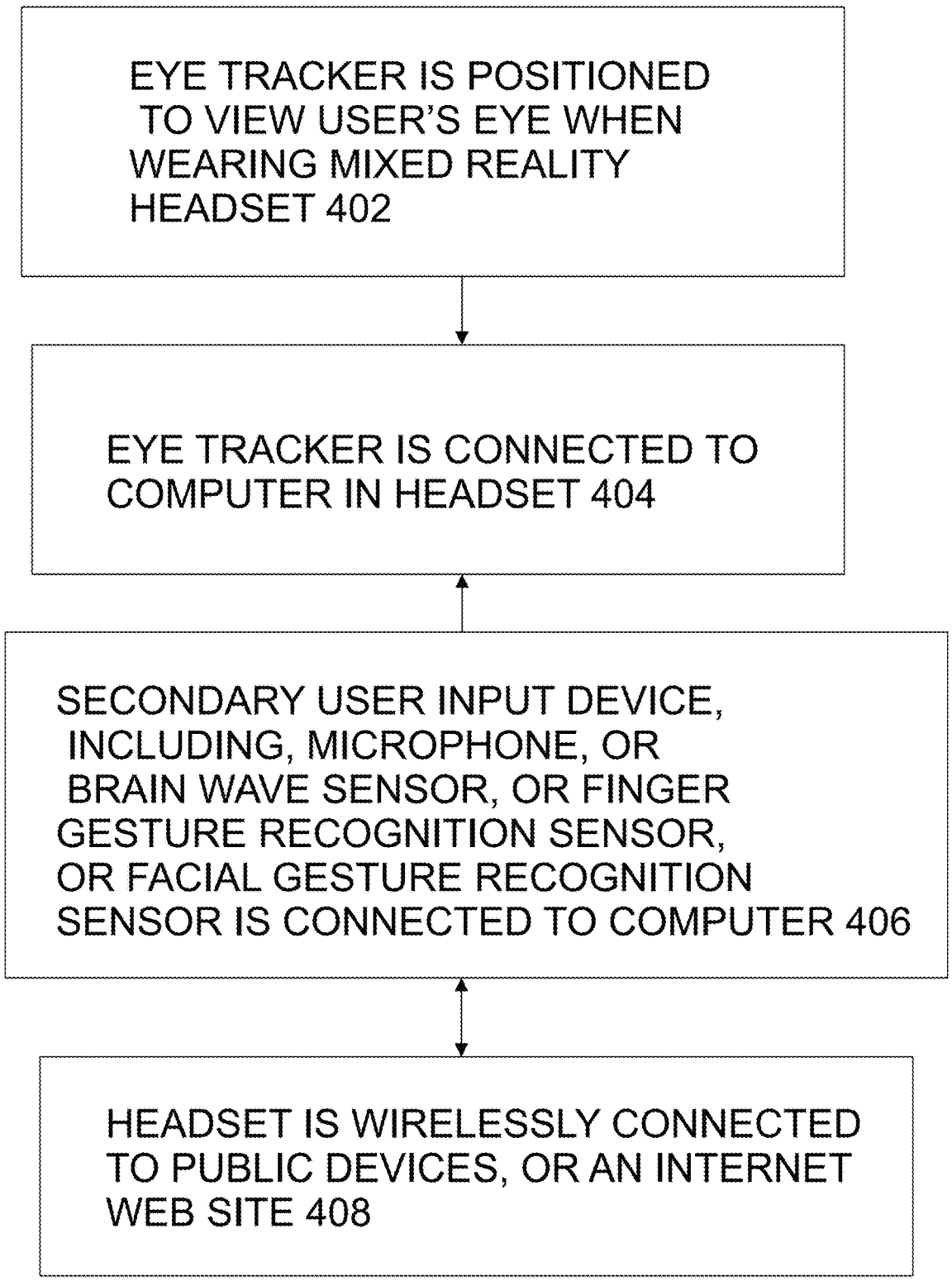
FIG. 10 illustrates a block diagram of hardware confections, between an AR reality headset having an eye tracking device, secondary input devices, including, microphone, brain wave sensor, finger recognition sensor, finger recognition sensor, and external public devices.

A block diagram of the connections, between the hardware components of the eye tracker, computer, device, or internet, is described in FIG. 10, which includes, eye tracker is positioned to view user's eye when wearing mixed reality headset 402, eye tracker is connected to computer in headset 404, secondary user input device, including, microphone, or brain wave sensor, or finger gesture recognition sensor, or facial gesture recognition sensor is connected to computer 406, headset is wirelessly connected to public devices, or an internet web site 408.

The Glasses Computer can be Used to Store Software

The glasses can keep and store the software which was downloaded from the device, to use with the device the next time the device is operated. The device can have a unique identifier, which is associated to its operating software, the identity can be used for the glasses to identify the device, and use the stored software for the operation of the device.

The software can be stored in a profile of user settings, which are associated with the user, and or the elevator.

The Glasses Computer can be Used as Computer for a Device

The computer in the glasses, can be used as the computer, which is used to operate an elevator. Other devices that the glasses computer may operate include, smart toilets, and automatic teller machines ATMs.

User inputs into the ATM, may include, login pin number, deposit input, withdraw input, checking account selection, and menu, inputted by the user, the computer in the glasses connects to the device, and is programmed with software for the device it operates.

The glasses computer can have preprogramed software to operate different devices, such as, elevators, vending machines, medical device, and self-serve gas pumps.

Example of AR Headset Used to Operate Multiple Devices, Including, an Internet Browser Description and Operation Internet Browser Wearing virtual, or mixed reality glasses, the user gazes at an icon, moves cursor to the icon, highlights the icon, and thinks left click at the highlighted icon at a web page browser icon 170, while on the elevator. A browser web page 170 is displayed. The user gazes at an icon, moves cursor to the icon, highlights the icon, and thinks left click, or the word left click is said, or moves a finger forward, or opens their mouth, at the highlighted icon to operate the browser, and search 172 the internet, for information, displayed on web pages, as shown in FIG. 6. Internet webpages can be displayed holographic ally, 3D or 2D, and interacted with by the user.

The user gazes at an icon, moves cursor to the icon, highlights the icon, and thinks left click, or the word left click is said 120, and heard by a microphone in the glasses 176, or moving a finger forward, or opens their mouth, at the highlighted icon at a virtual keyboard, and moves the cursor to the letters, numbers, and symbols, that they want to type. The user gazes at an icon, moves the cursor to the icon, highlights the icon, and thinks left click, or the word left click is said, or moving a finger forward, or opens their mouth, at the highlighted icon at the chosen letter, which inputs the letter. The user enters letters to create words, that are then requested to be searched. The search results are displayed.

A Smart Watch as Secondary User Input

A smart watch 112 is connected to the glasses 104, with radio waves, like, Bluetooth radio waves. A hand gesture, like, moving finger to the palm of the hand, by the user, is interpreted as a click command by the watch. The click information is sent to the glasses. The click clicks an input icon, on the web page 170, that is highlighted, by the cursor on the icon, that is at the same location as the gaze point of the user. The clicked icon activates the icon.

TV Show Web Site

The headset can access pay for movies, and TV shows, at on demand movies, and TV shows web sites. The user gazes at an icon, moves cursor to the icon, highlights the icon, and thinks left click, or the word left click is said, or moves a finger forward, or opens their mouth, at the highlighted icon activates a move icon that is a short cut to an internet link for a on demand movie, and TV show site.

TV show icons are displayed, that describe the TV show they are associated to. The icons are activated by gaze, spoken words, and thought. The user gazes at an icon, moves cursor to the icon, highlights the icon, and thinks left click, or moves a finger forward, or opens their mouth, at the highlighted icon activates one of the icons. The activated icon displays, opens a displayed window, showing the TV show's contents of moving pictures, and sound. The user views the show contents.

Internet Banking

The user gazes at an icon, moves a cursor to the icon, which highlights the icon, and thinks left click, or the word left click is said, or moves a finger forward, or opens their mouth, at the highlighted icon, which activates the icon.

A user's accesses their bank web site page, by searching in the browser for their bank name, and activating search results for their bank, when the user gazes at an icon, moves cursor to the icon, highlights the icon and secondary user input, at the highlighted icon.

The user gazes at an icon, moves cursor to the icon, highlights the icon, and secondary user input, at the highlighted icon activates a displayed sign in icon on the page. Card number, and password input areas are displayed. Input into the card number, displays a virtual keyboard.

The user gazes at an icon, moves cursor to the icon, highlights the icon, and thinks left click, or the word left click is said, or moving a finger forward, or opens their mouth, at the highlighted icon is directed at the first number on the keyboard that corresponds to the first number of the card, and the number is imputed into the card area. Gaze, and secondary user inputs, each number of the card in the card area.

The virtual keyboard for the password is displayed and gaze inputs the numbers, and or letters of the password. When the number, and password area are filled into the areas, a continue icon menu is open activated by gaze. The activation of the continue icon, opens a page where the user's account balances are displayed, which include, checking account, savings, credit card, loans, investments balances.

Make a payment, and a transfer funds icon is displayed. The payment icon is activated with gaze. Pre-entered billing companies entered by the user are displayed. A bill to be paid input area is activated. Gaze, and secondary user input, at the keyboard enters an amount of 18.00, into the bill to be paid input area. A verify payment icon is gaze activated. The funds are sent electronically, to the company from the user's account, over the internet. Gaze, spoken words, or, and thinking a thought, or moves a finger forward, or opens their mouth, to activate a gazed at sign out icon.

At an internet web browser site, gaze is directed at a Weather icon, a cursor moves to the gaze point at the icon, and thinking a enter thought, or the word enter is said, or moving a finger forward, or opens their mouth, activates the icon. The weather temperature, and precipitation amounts are displayed by the opened activated weather page.

Eye Gaze Used to Avoid Touching Bacteria on a Public Light Switch

The glasses may reduce the spread of anti-biotic resistant bacteria, when used to operate devices, such as, public light switches, by using eye gaze. The user doesn't need to touch physical control surfaces of the devices, to operate them, as illustrated in FIG. 7.

The surfaces may have bacteria, or viruses on them. The bacteria can be transferred to the user's fingers, infecting the user, and possibly causing illness. The user gazes, and thinks left click operation of the switch, which limits the bacteria, or viruses on hands, which limits the amount of bacterial transmitted from hands to surfaces, and from hands to other people.

Touch input devices, that are used by many users, may accumulate harmful bacteria, from users touching input buttons. The bacteria may spread, to the users touching the buttons. Examples of multi-user devices include, a smart toilet, an elevator, and automatic teller machine.

A Public Multi User Light Switch

A light switch is wirelessly, connected to the headset. The light switch is connected to a light. The multi user light switch control panel, has input icons, and is displayed in mid-air, by the headset. The icons include, a light off, or lights on icons, and a light dimming option.

The eye tracker, detects the user's gaze, and brain sensor detects brain waves, or the microphone detecting words being said, or moves a finger forward, or opens their mouth, at the off icon. The off icon is inputted, by the detection of the user's gaze at the off icon, the user gazes, moves cursor, highlights icon, and thinks left click, or the word enter is said. The light is turned off, by the input of the off icon.

Flammable Vapor Environment Device

When the user's headset 104, is in the vicinity of a flammable environment device. The headset wirelessly detects the device, and communicates with the device. The device control display panel icon, is downloaded to the headset's display 116. The downloading of the icon, indicates that the device is available for operation.

The headset may connect to, and communicate to different external devices, using a radio wave connection between the headset and the differing devices, and or an internet connection between the headset and the differing devices.

The user sees a flammable environment device icon, with a description of the device, associated with the icon. The user gazes, moves cursor to icon, highlights icon, and thinks left click, or the word enter is said, which activates the icon. The activated icon displays a control panel menu. The menu includes icons show differing functions, associated with operations of the device.

The user operates the device using eye gaze, and thought, or spoken words, or finger recognition, or facial recognition to activate differing icons, associated with differing functions of the device.

The headset control panel, can reduce the problem of static electricity, in a flammable vapor environment. The user may create a static electric discharge, between the user's finger and an external device's display panel. The electric discharge, may ignite air borne flammable vapor or material.

Using the eye gaze, and thought, or spoken words, to operate the device, reduces the need to touch the physical external device display, to operate the device. Using the headset in flammable environments, may be aid in reducing the chance of ignition of air borne flammable vapours or particles.

Airborne flammable vapor or particles may be present in the air, in locations, such as, silos with grain dust, petroleum refineries, and paint plants, etc. The flammable environment device could be a, gas compressor, an elevator, and a computer keyboard.

Static Electric Free Operation of Breathable Oxygen

A gazed at, and voice, or thought, or hand gesture, or facial gesture, can activate input icons on the glasses display, in mid-air for an oxygen tank. The touch free input, who allows for safe operation of flammable materials, such as, individual user oxygen tanks, for oxygen breathed by the user. Users don't have to worry about static electricity, igniting the flow of oxygen from the tank. The oxygen being inhaled for health reasons, that has a warning, to avoid sparks, or flame, that could ignite the flowing oxygen.

Computer Functions Activated by Input Icons Associated to the Device Example

The headset 104 has a speaker, and microphone 176. The user can make internet video calls. The user 114 can search the internet, by interacting with the display, in FIG. 6. The user can search the internet 172, with an internet search engine, or browser. The search results are displayed, on the display.

The user can surf the internet, view internet web pages 170, watch internet TV, view internet content, view, and listen to internet videos. The user may verbally chat with people, using the internet connection.

The user can play online computer games, such as, online internet role playing games. virtual worlds, and computer games. The headset, can find a car in a parking lot.

Automatically Display Device Control Panels

The glasses headset maps the room, the location of the physical control panel of the device, and the device. The display shows the holographic, 3D control panel, which operates the device. The 3D control panel is 1 meter, from the devices physical control panel.

The user can change, and set the location, and distance the 3D control panel, is from the devices control panel. The 3D control panel can be operated independently of the device's location, for example, an elevator call control panel, can be operated 5 meters for the elevator control panel, and out of view of the physical panel. The user can call the elevator, using the 3D call panel. Some devices can rely solely on the 3D panel for operation, without having a physical touch screen input control panel.

Many devices 3D menus can be displayed within close proximity to each other, in the same room, such as, a vending machine menu, an elevator call button, and an automatic teller machine.

Space Station Devices

In a space station's dry air environment. The user may create a static electric discharge, between the user's finger and a physical display panel, that is used to operate a device. Static electric discharge is reduced, by not touching the physical input panel. Eye gaze, stare, look, peer, survey, scan study, watch, inspect, see, glance, and thought, idea, imagine, think, or finger recognition, or facial recognition allows a device, to be operated without needing to touch, the physical display panel.

A space station's devices, can include a variety of devices, such as, a space station robotic operating arm control panel. A mid-air displayed option to operate the arm left-handed, or right, can be inputted with gazes at an icon, moves cursor to the icon, highlights the icon, and thinks left click, or the word left click is said, finger recognition sensor, and facial recognition sensor to at the highlighted icon. A space station toilet, a medium toilet water temperature setting, can be displayed and inputted.

The headset's operation, can be described as a universal mobile input device, for operating different devices. For example, a space station headset can operate, the space station moving arm, and then in a different input configuration, the headset can operate a station camera mover. The headset operates many devices, without the need of having two, or more different physical input devices.

The headset can save space, by allowing to the control panel to be virtual, without need for a physical control panel. The headset can have control panels, for different devices, saving the space needed for the physical different panels.

Public Door Lock

The headset screen can show a door's unlock options, such as, yes, or no. Using user gazes at an icon, moves cursor to the icon, highlights the icon, and thinks left click at the highlighted icon to activate a yes, or says enter, or moves a finger forward, or opens their mouth, to wirelessly signal, the door to unlock. The lock could also use a pin number, to unlock the lock. Entering the pin number, would unlock the door. With the door unlocked, the user has the option of locking the door using a shown, lock door icon on the display.

A car menu shows, a start, or stop engine options. The user gazes at an icon, moves cursor to the icon, highlights the icon, and thinks left click, or the word left click is said, or moves a finger forward, or opens their mouth, at the highlighted icon activates either stop or start icons, which activates the associated functions of the car. A preferred car seat temperature icon, can be displayed, and inputted. The user operates the room temperature icon, by gaze activating, a desired temperature number shown on the headset.

Public Room Thermostat

Room temperature can be controlled by the user gazes at an icon, moves cursor to the icon, highlights the icon, and thinks left click at the highlighted icon. The headset display can show a thermostat, whose temperature can be raised or lowered. The user operates the multi user room thermostat, by gaze, spoken words, finger gesture, facial gesture, and thought activating, the desired thermostat's temperature number shown on the headset.

Multi User Radio

The eye gaze, thought, or user sound input, or moves a finger forward, or opens their mouth, headset display operates a radio, by using the radio's displayed operating menu, such as, FM or Am channel selection, and volume control, increase or decrease volume.

Public Microwave Oven

The headset operates a microwave oven, in a convenience store, that cooks food from the store, using eye gaze, and thought, or spoken words, or moves a finger forward, or opens their mouth, to operate a microwave oven operating menu, such as, cooking time, and heat power setting percentage.

Public Laptop

The eye gaze, and thought, or spoken words, or finger recognition, or facial recognition, imputed into the glasses' headset display, can operate a public laptop computer. The multi user laptop input display is shown on the headset display. The laptop display shown on headset display can operate the computer, in a similar fashion as the display on the computer would operate the computer.

The user gazes at an icon, moves cursor to the icon, highlights the icon and secondary user input, at the highlighted icon at the computer display icons on the headset display, which operates, and inputs data to the laptop computer. The headset display is connected to the computer, using and internet connection, the user can surf the internet, and operate other computer applications. The laptop is connected to the internet.

Public Television

The eye gaze, and thought, or spoken words, inputted into the headset operates a public multi user TV, by using the TV's displayed operating menu, by using the TV's displayed operating menu, such as, channel selection number, and sound volume control, increase or decrease volume.

Machine in a Dust Free Environment

Eye gaze, and thought, or spoken words, input may be beneficial, in a dust free environment, such as, in microprocessor fabrication environments. The headset doesn't have moving parts. Physical key boards have moving parts, whose movement may create friction with each other, which can create dust.

When a finger or glove touches a physical input surface, to input, the touching of the finger to the surface, creates friction between the finger and the surface. The friction causes particles from both surfaces to detach from the surfaces, and become airborne. The particles then descend to a surface, which creates dust on the surface. Dust on the surface of a microprocessor, may have a negative impact on the microprocessor's production.

A virtual keyboard is displayed by the headset, in the dust free environment. A on off switch displayed. The headset is connected, to a microprocessor fabrication machine.

Eye gaze, and thought spoken words, input MR reality glasses are used in the dust free environment to input into a control panel in the environment, to operate a device.

Detection of gaze by the gaze sensor, at the icon produces a visual change in the icon, such as, a highlight of the icon. Detection of specific thought, by the thought sensor, activates the highlighted icon, thought such as, click, or moving their tongue side to side or moves a finger forward, or opens their mouth.

An input panel 216 is displayed on the glasses' lens. The input panel is viewed by the user. The view of the panel, appears to the user, as being displayed in mid-air.

Figure 8:
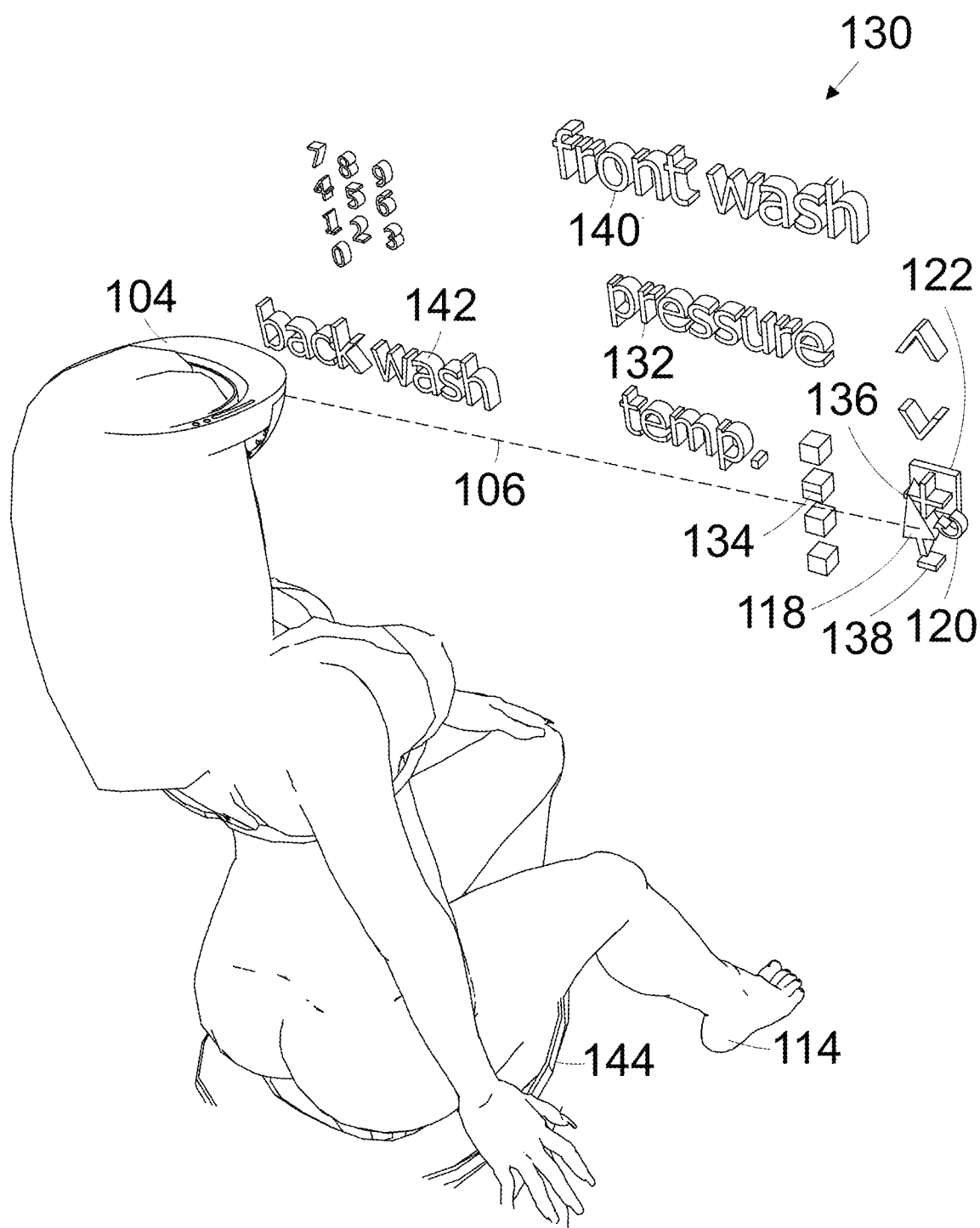
FIG. 8 shows a perspective view, of an AR headset with an eye tracking device, secondary input devices and augmented reality smart toilet input display.

A cursor 218 is display, with the input icons, as shown in FIG. 8. The displayed icons, can be in 3D 212, or two dimensionally 2D 210.

Talking Icons

The holograms can move, change shape, and be animated, for example, the hologram can be, a moving, and talking, cartoon character, such, as bugs bunny, or Lisa Simpson. A speaker in the glasses, can broadcast, the characters talking. The speaker is connected, to the computer in the glasses.

The talk, or vocalizations of one of the characters, can describe the input button's function, that the character is associated to, such as, the character can say, 'I can increase, the water temperature'.

The user can identify each hologram, by identifying each hologram from each other hologram, by visually having each hologram be different from each other hologram.

Sound Feedback

Sound can be associated to the gaze of each icon, such as, a bell note, music, a cat's meow, and a chime. Sound can be associated to the activation of the input, such as, a piano note. The sound is broadcast, from the speaker in the headset.

The sound lets the user know that they have been gazed at, and or activated the icon. The user can set, and input the sounds associated to the icons Gaze, Thought, or Voice for Fast Food Self Serve Restaurant Kiosks Description A fast food self-serve order restaurant has a kiosk with a display. The display shows, restaurant food and drink menu item, and payment options. The kiosk connects to an AR headset with eye tracker, and brain wave sensor. The headset displays the menu, on display in mid-air.

The eye tracker views a user's eyes, when they look at the display. The eye tracker views, and tracks, the user's eye's gaze.

The Restaurant's Menu

The restaurant's menu, includes, hamburgers, cheese burger, peperoni pizza, ham pizza, slice of cheese pizza fried chicken leg, french fries, fried chicken breast, bean burrito, beef burrito, salmon sushi, scrambled eggs, hot dog, chili, chicken sandwich, fish sandwich, beef wrap, pork fried rice, shrimp and noodle, salad, egg breakfast, sandwich, salad with chicken, baked potato, meatball submarine sandwich, chicken soup, chocolate donut, coffee, ginger ale, coke, orange soda, milk, and water.

Gaze Operating the Menu Display

Each menu item has a picture icon, that is a picture of the item, such as, a beef burrito icon is a picture of the beef burrito. The menu food, and drink icons are inputted by gaze, and thought, or spoken words, or gestures. into an order associated to the user. Items in the order can be remover by gaze inputting the item in the order, which displays a check mark next to the item. The user gazes at an icon, moves cursor to the icon, highlights the icon, and thinks left click, or the word left click is said, at the highlighted icon, at a remove item icon, and the check marked item is removed from the order.

Self-Serve Restaurant Payment

The eye and thought glasses, or microphone, show order payment menu input icons, that include, a cash payment, credit or debit card payment. A total products price amount area is displayed.

The user views the different input commands, on the eye display, such as, a ten-key number pad, amount of purchase, accept purchase amount, enter, and credit card number.

The user inputs numbers into the display pad, by individually gazing, and thought at one of the numbers, such as, a number 2. The numbers can be entered, to input a number of a debit card, or credit card pin number into the computer. The input can be shown on the display.

A credit card can be read, by a credit card reader, at the station. The credit card can be read by opening the user's financial account, such as, bank account, electronic commerce (e-commerce) company account, debit card, credit card account over the internet, and paying from the account. The computer inputs a PIN number, inputted by the user.

The payment information is displayed on the display can be used as, a self-serve checkout display, where the user checks out their own purchases. The payment display can also be, a served checkout payment display, where an employee of the restaurant, checks out the user's food or drink purchases, and accepts payment for the purchases.

The data inputted by the user into the eye display, is displayed on the display. The displayed data keeps the user informed about the payment stations operation, and interaction with the user. The user can use the displayed data, to adjust the operation of the payment menu, such, changing a personal identification number PIN number if a first number is incorrect.

Connections Between Headset and the Restaurant Computer

The headset computer connects to the restaurant computer, which is connected to the kiosk. The restaurant computer connects to a restaurant employee display.

The headset computer has computer operating software, and eye tracker operating software. The headset computer operates the AR display, and the eye tracker. The restaurant computer operates the menu and payment menu.

Restaurant Employees Viewing the User's Order

The menu items inputted by the user into the headset display, are sent to the restaurant display. The restaurant employees view the user's order. The employees prepare the ordered food. The prepared food can be picked up by the user, or delivered to the user's table.

Transference of bacteria from the payment station touch control panel is reduced, by using the eye menu control panel to order food.

Gaze, Thought, or Voice for Fast Food Self Serve Restaurant Kiosks Operation

Gaze is continued at the input start order icon, and thinks left click, or says yes, or moves a finger forward, or opens their mouth, the icon is activated. The items that the user orders are part of the order. The order is assigned to the user, with a number, or a picture of the user taken by a picture camera in the display. The order is viewed by the employees.

The user uses their eye gaze, and thought, or spoken words, to activate the cheese burger input icon. The cheese burger icon is clicked, and activated. The activated cheese burger, is put on the user's order.

The user can active another icon command, after the first command is activated, etc. Other commands include, a cancel icon, and the number 2 input number. The user completes their order, and gazes, and thought at a finish and pay icon. The user pays with the credit card, and waits for their order to be prepared.

A cursor is displayed with the input icons. The cursor follows the user's gaze. The gaze moves the cursor to an icon. The finger is moved up or down quickly, to left click, and activate, the icon, contacted by the cursor.

The cursor contacts the ham pizza icon on the display. The ham pizza icon is highlighted. The user moves their finger up and down quickly, and the ham pizza icon is left clicked, and activated. The activated ham pizza icon is associated, to activating a restaurant function of the eye computer, to have the ham pizza, include in the user's order.

Thought Input

The user gazes at the hamburger input icon command, they want to activate, the hamburger icon is highlighted. The user thinks activate, which activates the hamburger icon. The activated the hamburger icon, causes the hamburger to be included in the user's order.

MR Glasses Connected to an ATM Using Eye Gaze, and Thought or Spoken Words or Finger Gesture or Facial Gesture to Input into the ATM Description An eye tracker, and brain wave sensor headset has a computer. A brain wave sensor input device is wirelessly connected to the headset computer. The brain wave sensor contacts a part of the user's head, or other part of their body, or microphone hears words, an input icon is displayed by the headset.

Gaze is directed at an input icon, displayed in mid-air, the thought detection is activated by finger pressure for the user, the finger pressure creates brain waves, the activated thought detection, or the word enter is said, which signals the computer to left click, and activate the gazed at icon. The icon is activated.

An ATM

An automatic teller machine ATM, is connected to the headset computer, by radio waves. The computer can act as the primary computer for the atm, and operate the atm, or can connect to an atm computer that operates the atm.

The computer is programmed with an atm operating software, an eye tracker software, and a computer operating software, voice recognition software. The computer is connected to an internet, for communicating to with atm devices, servers, or other computers over the internet.

The AR glasses are connected, to a blue tooth or Wi-Fi radio device transmitter and receiver. The automatic teller machine atm is connected to a blue tooth or Wi-Fi radio device transmitter and receiver device. The glasses connect wirelessly to the atm radio device when the glasses are within 5 meters or more of the atm.

The atm has software operating instructions for the various functions and devices of the atm. The atm instructions are displayed on a mid-air menu by the glasses. The mid-air menu, is viewable by a user.

The menu is pinned to the front of the atm. A credit card, debit card reader is connected to the atm. One card reader, has radio frequency identification card reader (not shown), for tapping the card on the reader, to input the card.

AR Glasses Connected to an ATM Using Eye Gaze, and Thought Input Operation

The user identifies themselves to the ATM, by the glasses matching a view of the iris on the user, with a stored iris view of the user, or the glasses use facial recognition to identify the user. The user looks at the displayed holograms in mid-air. The eye tracker views the user's eyes, and determines the point that the user is gazing at on the displayed hologram.

The user views the one or more menu items that are displayed on the display screen. The user chooses one of the menu icons, that they want too active.

The user gazes, and thought, or user input sound, or hand gesture input, or facial gesture input, words at the atm display. The eye tracker detects the user's gaze. The display asks for the user's personal identification number pin. A number ten key number pad, and or key board is displayed. The gazes at the number that the user wants to input such as, a number. The number 2 is highlighted, the cursor is located at the number 2. The and brain wave sensor, and, and thinking a enter thought, or microphone hears the word enter is said, or hand gesture input, or facial gesture input, which left clicks the number 2, and the number 2 is activated. The activated number 2 forms part of the pin number.

The user inputs numbers until the pin number is complete. The user gazes, and thought or ATM user input sound, or hand gesture input, or facial gesture input, clicks, a displayed enter input icon, until it activates. The enter input icon inputs the pin number. The user's account information is displayed.

The user can active different ATM services, by gazing, and thought or spoken word clicking, at icons displaying, and associated to a checking account balance, a savings account balance, a credit card account balance. The user can deposit funds, or withdraw funds from the different accounts, using gaze at inputs associated to the accounts, shown on the display.

The gaze, and thought, or spoken words, is directed to the checking account balance. The checking account details are displayed. The gaze, and thought is directed at a checking account balance, having a withdrawal amount icon. Withdraw amounts are displayed, such as, 20, 40, 100, 200. The user can active with gaze, and thought or spoken words click, one of the displayed amounts. To enter a different amount, the gaze, and thought click, is directed to a different amount.

The ten keypad is displayed, of inputting the different amount. The user gaze, and thought or spoken words clicks, each number, the 2 number, and the 0 number, that makes up the amount the user would like to withdraw, such as, a 20.00 amount. The user gazes, and thought clicks. the enter icon. The withdrawal amount is entered, by activating the enter icon. The ATM dispenses the 20.00 amount.

The user is asked on the display, if the user would like another request. The user gaze, and thought or spoken words clicks, a cancel input icon, and the interaction is complete, and the user is signed out of their account.

Receiving the ATM's Menu

The ATM broadcast using radio waves, or on the internet, that it is available to have its control panel menu down loaded. The glasses receive the broadcast, and downloads the menu. The glasses display the ATM's menu in mid-air. The glasses, and ATM are connected wirelessly, and transmit and receive information with each other.

The user can set the glasses, too automatically, or manually, connect to the ATM. When the glasses connect to the ATM, the display menu pad for the ATM is transmitted to the glasses. The received ATM control panel menu, is holographically display in mid-air, for the user to view and input in to.

The user inputs numbers into the menu pad, by individually gazing, and secondary input clicking, at one of the numbers, such as, a number 4. The numbers are entered, to input a debit card pin number into the computer. The input is shown on the display. A credit card is read by the credit card reader.

The menu in the mid-air control panel, are pinned to a location which is gaze assessable by the user, when the user is near ATM, such as, 0.5 meters in front of the user. The user views the different input commands, for the ATM, such as, a ten-key number pad, amount of purchase, accept purchase amount, enter, and credit card number.

The user gazes, with their eyes, at the 8-number input icon command they want to activate, the 8 number is highlighted. The gaze, and thought, or spoken word clicked the icon, the icon command is left clicked, and the command is activated. The user can active another icon, after the first icon is activated. The eye tracker views and tracks, the user's eye's gaze while they wear the glasses.

The user gazes at the 8-number input icon command they want to activate, for a predetermined amount on time, such as, 0.4 seconds, the 8 number is highlighted. The user thinks activate, which activates the number 8 icon. The user can active another icon command after the first command is activated. The eye tracker can view and track, the user's eye's gaze while they wear glasses.

When an atm icon is activated, the atm transmits to the glasses that the icon is activated. The ATM sends data about the status of the activated device, such as, payment accepted, or enter pin number.

The data sent from the ATM is displayed on the mid-air display. The displayed data keep the user informed about the ATM operation, and interaction with the user. The user can use the displayed ATM data, to adjust the operation of the ATM, such, changing a personal identification number PIN number if a first number is incorrect.

User gaze, and secondary input, inputs of one of the holograms, by the user's eyes, to input a request to the computer. The computer directs the ATM to carry out the input request of the user, to enter a pin number. For example, the user gazes at an enter input hologram. An input is detected by the brain wave sensor of the computer. The enter command, enters, a pre inputted displayed pin number.

MR Reality Glasses Headset Used as a Head Up Display for a Car Description

MR glasses are connected to a blue tooth or Wi-Fi radio device or a 4G, radio tower, transmitter and receiver. A car's devices, are connected to a blue tooth or Wi-Fi radio device transmitter and receiver device. The glasses connect wirelessly to the car's devices, when the glasses are within 5 meters or more of the car, and when the driver is in the driver's seat.

The headset's thought brain wave detecting sensors, are used to detect the user's though input commands. An eye gaze sensor and or microphone, or finger gesture recognition sensor, and facial gesture recognition sensor, connect to the glasses.

The car has software operating instructions icons, for the various functions and devices of the car. The car instructions are displayed on a mid-air menu by the glasses.

The menu is displayed in mid-air, and can be pinned to the dash board of the car. The car's devices can include, radio, climate control temperature, head lights, interior lights, ignition on or off, air fan speed, air venting defrost or feet warming, movies for passengers, computer games for passengers, engine temperature, oil warning light, and seat belt off warning.

One hologram displays an increase symbol, a second hologram displays a decrease symbol, and a third hologram displays a, toggle, or change car component symbol.

The glasses project a user interface above the car dash board, and within touching distance of driver or passenger. The interface includes car device components commands, such as, radio station search, pre-set radio stations, increase or decrease radio volume, heat increase or decrease, fan speed increase or decrease, windshield wipers on, wiper speed increase or decrease, ground positioning system map, headlights on, and headlight low or high beam.

Car instruments can be displayed by holograms, such as, speedometer, engine revolutions, engine oil alert, and engine temperature alert.

The radio hologram interface includes, a graphic number station indicator, a sound volume indictor, a switch to another device switch, sound volume increases, or decrease holograms, and radio station change station increase or decrease holograms.

The vehicle is equipped with, and connected to the car's computer, pedestrian or vehicle detection sensors, radar, and vehicle cameras and sensors (not shown).

AR Reality Glasses Headset Used as a Head Up Display for a Car Operation

The car broadcast radio waves that it is available to have its control panel menu down loaded. The glasses receive the broadcast, and downloads the menu. The glasses display the menu in mid-air. The glasses, and car are connected wirelessly, and transmit and receive information with each other.

A user can set the glasses, too automatically, or manually, connect to the car. When the glasses connect to the car, the display menu for the car is transmitted to the glasses. The received car control panel menu is display in mid-air for the user to view, and inputted into.

The menu in mid-air control panel is pinned to a location, which is gaze accessible by the user, when the user is near dashboard, such as, 0.5 meters in front of the user. The user views the different input commands, for the car, such as, turn on or turn off lights.

A cursor occupies the same location as the gaze point, and follows the gaze point's movement around the display. The cursor shows the user where their gaze is directed. The cursor is activated, left, clicked by secondary user input.

The user gazes at the command they want to highlight. The user uses their thought or spoken words gestures, to activate the command they want activated.

The user gazes with their eyes at the command they want to activate, and thought or spoken words and the command is activated. The user can active another command after the first command is activated.

The user uses mind thoughts to think about the command, for a predetermined amount on time, such as, 0.2 seconds, at the 0.2 seconds the command is clicked, by the user, and the command is activated. The user can active another command after the first command is activated.

The user can change the location that the mid-air input display is positioned or pinned to in mid-air. The display location can be pin to a location which is convenient for the user.

When a car icon is activated, the car transmits to the glasses, that the icon is activated. The car sends data about the status of the activated device, such as, speed of the car. The data sent from the car is displayed on the mid-air display. The displayed data keep the user informed about the car's operation, and interaction with the user. The user can use the displayed car data, to adjust the operation of the car, such as, changing the speed of the car.

If a pedestrian or vehicle is detected to close to the car, or on a course where the pedestrian or vehicle may contact the car, the pedestrian is highland on the windshield. The pedestrian or vehicle is viewable with a red flashing outline, halo around the pedestrian. The highlighting allows the driver, to act to avoid possible contact, with the pedestrian or vehicle. The pedestrian or vehicle is detected by sensors, radar, pedestrian or vehicle cameras and sensors in the car (not show).

Mid-air gaze input of one of the holograms, and thinking a thought by moving the user's finger, which produces brain waves, inputs a request to the computer. The computer directs the car to carry out the input request of the user. For example, the user's gaze, and thought or spoken words enters an input hologram. The enter input is detected by the sensors, and the computer. The computer directs the car to use the light's high beams.

The user can input using the glasses' devices to input, such as, using eye input or thought or spoken words. The user can user the eye tracker, and or the thought head set it input into the glasses' computer.

The glasses allow the driver, to keep their eyes on the road, with needing to look away from the road, while operating the cars device. The user can operate the car's devices, without being distracted by looking at the devices operating control panels. Being able to view the road while driving, increases the ability to drive safely without distraction.

The user can maintain their view of the road while driving, and operate components of the vehicle without having to take their eyes off the road, and by gazing at holograms which are in direct view of the user. The holograms act as a heads-up display, of available gaze input commands which are used to operate the various car components. The user can view the car's speedometer, or engine rpm, holographic ally.

The input of one of the holograms inputs the action, or command associated to the hologram. The user gazes at the input area associated with the hologram, when they gaze at the hologram. The computer receives the input, and activates the function associated to the input. The device associated to the function receives operating function instructions from the computer. The device's operation is affected by the computer instructions.

The user can gaze, and thought or spoken words, or hand gesture input, or facial gesture input, at the number the radio station the radio is tuned to, to change the radio station to the number the user desires. The user can change the station, by gazing, and thought at the radio station change station increase, or decrease holograms, which increases, or decreases the station tuning number.

The user gaze, and secondary inputs, a number the radio station that the radio is tuned to, to change the radio station to the number the user desires. The user can change the station, by gaze, and thought or spoken words, or hand gesture input, or facial gesture input, of the radio station change station increase, or decrease holograms, which increases, or decreases the station tuning number. The user can switch between the radio receiving amplitude modulation AM, and frequency modulation FM radio waves, of the change car component symbol, which will change to FM, or AM.

For example, the user can increase, or decrease the volume of the radio, with gaze, and secondary input, directed at a displayed increase, or decrease the volume symbol of the radio, and view the volume of the radio on the volume indicator, to view the radio's volume.

When the change component hologram is gazed, and thought at, or the word enter is said, or hand gesture input, or facial gesture input, it goes to the next component, and displays the components hologram interface. Other components include, climate control heat, and head light brightness. The change holograms image changes, to represent the competent is use, such as, a musical note symbol is shown when the radio is on, or a light bulb is shown when the lights are chosen for input.

The user can turn on the head lights by gazing, and thought, or spoken words, or saying enter, or finger gesture recognition sensor, and facial gesture recognition sensor, at the turn on head lights hologram (not shown) with their gaze. The user's gaze contact with the light hologram, and is detected by the eye tracker, and thinking a thought by the brain sensor, or saying enter, detected by the microphone, which is connected to the computer, in the headset, and the headset computer is connected to the car computer by radio waves. The computer activates the turn headlight on function. The computer sends instructions to the headlights switch to turn on the headlights. The light switch is switched to the on position, the lights are turned on.

The user can keep or remove different devices control panels, to lessen the number of control panels viewed, with gaze, or thought or spoken words. The holograms can be used for different devices, by changing the components the holograms are associated to. The change to another device switch of the input holograms is used to switch or toggle between the different components. For example, the holograms may be used in the operation of the radio, the user can switch their association to a next component, such as, the operation of a ground positioning system GPS map display, or the air heating system.

The holograms can remain continually activated, or can be turned on and off, by the user using their gaze to contact a turn off or turn on off hologram (not shown).

Glasses Connection to the Internet Through the Phone

The glasses are connected to a mobile device (not shown) that is connected to the internet, such as, a smart phone, a laptop computer, or a tablet, using Bluetooth, or WIFI Direct. The glasses, and mobile each device have a blue tooth or Wi-Fi radio device transmitter, and receiver. The glasses connect wirelessly to the mobile device when the glasses are within 5 meters or more of the mobile device, or smart phone.

The glasses use the phone's connection to the internet, to connect to and access the internet. The internet is accessed over the cell phone network. Internet webpages can be displayed holographic ally, and interacted with by a user, with the devices in the glasses.

The glasses display a menu of internet applications APPS, or software operating instructions for the various functions and devices of an internet web browser, such as, translate page to another language, search, print page. The glasses apps are displayed, on a mid-air menu by the glasses. The mid-air menu can be pinned to a location near the glasses.

The glasses have a cell phone network, transmitter and receiver, that connects to the glasses' computer. The transmitter, and receiver, connect to a cell phone network, such as, a global system for mobile gsm, or a code division multiple access cdma cell phone network AR Headset Self Driving Car Description Mixed reality glasses 842, have an eye tracking sensor, and brain wave sensor, or microphone, or finger gesture recognition sensor, or facial gesture recognition sensor, as illustrated in FIGS. 4, and 5. The headset displays mid-air input icons. The eye tracker in the headset, allows a user's eye gaze, to highlight the input icons, and the user's waves are detected by a brain sensor 840, or microphone detects spoken words, or hand or facial gestures, that activate the icon.

Detection of gaze by the gaze sensor, at the icon produces a visual change in the icon, such as, a highlight of the icon. Detection of specific thought, by the thought sensor, activates the highlighted icon, thought such as, click, or moving their tongue side to side. Detection of the specific word enter, is said, and detected by the microphone sensor, activates the highlighted icon.

A self-driving car's control panel, is displayed, by an augmented reality AR headset, glasses. A user views the display, while wearing the headset on their head, and looking through lenses in the headset. The control panel could also be viewed by projecting it, into the user's eyes, which interpret it as a display. The headset and user are inside of the car. The AR headset is a portable computer, with a display.

The augmented reality or virtual reality, or mixed reality MR headset, has an eye tracker positioned in the headset, to view the user's eyes of holographic mid-air input symbols. The eye tracker views a user's eyes, when they look at the mid-air display, as shown in FIGS. 4, and 5.

The ar glasses, can also turn into a virtual reality vr headset, or switch between, ar or vr glasses. By activating a vr, or ar switch, with gaze, and secondary user input, that is displayed in mid-air.

The eye tracking display 804 shows, car input buttons, such as, start car, stop car, a fan speed increase, or decrease, a heat temperature thermostat increase, or decrease temperature, radio setting inputs, and an interactive internet map.

The headset computer connects to a global positioning system GPS device, in the headset 842. The map knows the headset's location. The map is used, for the user to request the car travel, to a chosen destination on the map. The map displays the car's location with a car icon on the map. The map can be used to find the car, by using the map to follow a route to the car.

The computer has car operating software, computer operating software, and eye tracker operating software. The computer operates the car, or connects to computers that operate the car, operates the display, and operates the eye tracker.

The car, and headset computer can connect to each other through an internet, with the car connected to the internet, and the headset connected to the internet. The self-driving car can be a taxi, a ride sharing car, a public multiuser car, and a community used car.

The car icon is connected to an internet address of the car's control panel, user menu components. The car control panel to be sent over the internet to the headset, by the activation of the car icon. The headset operates the car over the internet.

Also the connection of the car and portable computer can be through radio waves, with the activation of the car icon, by the user, is associated to activating a request to send the control panel to the headset by using radio waves. The headset operates the car using the radio waves.

The computer has car operating software, computer operating software, and eye tracker operating software. The computer operates the car, the display, and the eye tracker.

The headset can connect wirelessly radio waves 844, using Bluetooth, or wifi, to a phone 814. The phone connects an internet, wirelessly thru cell phone towers. The Bluetooth radio waves, low power, keep high power cell tower radio waves away from the head of the user, which may be safer. The headset uses less power, connecting to the phone, then to the tower.

The phone shows the same phone map 812, that is shown by the glasses display in mid-air.

Voice Recognition

A microphone is connected to the computer, and positioned to detect the user's spoken words. Words spoken, by the user, can activate the displayed icons. The input icons are highlighted by gaze, and are left clicked by saying a pre-programed activating word like, click.

The user can verbally, input one of the mid-air input icons, or letters of the mid-air display menu, gaze highlighting a such as, an increases volume icon, and by the user verbally saying click. Voice recognition software in the glasses' computer, detects the saying of the word click, and left clicks the displayed increases volume icon, and activates the increases volume icon. The activated increases volume icon is associated, to activating an increases volume function of the radio.

Temperature increase or decrease icons are displayed. The user gazes at the increase temperature icon. The temperature icon is highlighted. Eye gaze, thought, or spoken words are interpreted as a left click gesture. The interpretation left clicks, and activates the icon. The activated increase icon increases the temperature inside the car.

Hand Gesture or Facial Gestures

The start icon is highlighted, by gaze. The user moves their finger up and down quickly, and the start icon is activated. A hand gesture or facial gestures sensor in the headset detects the gesture. The activated start icon, activates the car to start moving toward a chosen destination.

Thought and Gaze Input

A thought input device is part of the headset, and connected to the computer. The user uses gaze to highlight the command they want to activate, such as, the increase volume icon for a predetermined amount on time, such as, 0.4 seconds highlights the increase volume. The user thinks yes at the increase volume icon. The yes thought left clicks the highlighted increase volume icon. The activated increase volume icon increases the volume of the radio in the car.

Car's Devices

The car's devices can include, radio, climate control temperature, head lights, interior lights, ignition on or off, air fan speed, air venting defrost or feet warming, movies for passengers, computer games for passengers, engine temperature, oil warning light, and seat belt off warning.

The interface includes car device components commands, such as, radio station search, pre-set radio stations, increase or decrease radio volume, heat increase or decrease, fan speed increase or decrease, windshield wipers on, wiper speed increase or decrease, internet map, headlights on, and headlight low or high beam.

The radio hologram interface includes, a graphic digital number station indicator, a sound volume indictor, a switch to another device switch, sound volume increases or decrease holograms, and radio station change station increase or decrease holograms.

The vehicle is equipped with, and connected to the car's computer, pedestrian or vehicle detection sensors, radar, and vehicle cameras and sensors (not shown).

Car instruments can be displayed by holograms, such as, speedometer, engine revolutions, engine oil alert, and engine temperature alert.

The radio hologram interface includes, a graphic number station indicator, a sound volume indictor, a switch to another device switch, sound volume increases or decrease holograms, and radio station change station increase or decrease holograms.

The User Input Devices for Described Embodiments in the Proceeding Embodiments

The eye tracker, thought headset, and microphone, are user input devices. The input devices, are part of the headset. The input devices, detect eye gaze, thought, and spoken words. The user's eye gaze, thought, or spoken words is detected by the input devices. Either the detected eye gaze, thought, or spoken words, can be used to active the displayed input icons.

The detected input, activates the input icons. The activated input icons are associated to influencing, and operating the self-driving car devices, and the other alternately described embodiments.

Different Way the Cars Control Panel can be Uploaded to the Glasses a) The cars control panel can be automatically uploaded from the car to the glasses over the internet. The upload can be set to be distance activated, such as, the control panel uploaded when the glasses are 24 meters from the car. The control panel is shown, by a short cut on the glasses that describes the cars control panel. The gaze, and secondary input activation of the short cut icon, displaying the control panel. The car is found by the map, showing the glasses, and car's location on the map. The map shows streets, and buildings.

b) The car's control panel can be manually uploaded from the car to the glasses, over the internet, by the user gaze, and secondary input activating a car icon on the map. The car is then operated by the glasses over the internet, with the gaze, and secondary input panel. The car icon graphically, and or with word describing the car, so the user can identify what the icon represents.

b1) The gaze, and secondary input activation of the car icon, activates an internet link to a download of the control panel to the glasses, which downloads the control panel to the glasses, and the glasses displays the panel.

b2) The gaze, and secondary input activation of the car icon, activates an internet link to a displayed web page, showing the car control panel on the glasses. The user gaze, and secondary input operates the car, by gaze, and secondarily inputting displayed operations commands for the car, on the web page. The web page shows information about the car, such as, how much gas in the car, if available for use, and if it's reserved by other users.

b3) The gaze, and secondary input activation of the car icon, activates a web page showing a gaze, and secondary input, mid-air input internet link to a displayed web showing the car control panel on the glasses. The user gaze, and secondary input operates the car, by gaze, and secondary inputting displayed operations commands for the car, on the web page. The web page shows information about the car.

b4) The activation of the car icon, activates a web page showing a gaze, and secondary, mid-air input of a mid-air internet link to activating an internet link, to a download of the control panel to the glasses, which downloads the control panel to the glasses, and the glasses displays the control panel. The web page shows information about the car.

c) The car's control panel can be manually uploaded from the car to the glasses over the internet. By the user gaze, and secondary input activating a car icon on the map. The car is then operated by the glasses by using radio waves, with the gaze, and secondary input, mid-air input panel. With the glasses connected to the car with radio waves.

d) The cars control panel can be automatically uploaded from the car to the glasses with radio waves. The upload can be distance activated, 46 meters, which is determined by the glasses and car being within radio range of each other, such as, a Bluetooth connection established at 30 meters, or WIFI direct connection maybe 35 meters, from each other.

The uploaded control panel shown by a short cut on the glasses, describes the cars control panel. The gaze, and secondary input activation of the short cut icon displays, the control panel. The car is found by the map showing the glasses and car's location on the map. The map shows streets, and buildings.

e) The uploaded control panel is saved to the glasses' storage. When the glasses detect the car, by either distance on the map, or the automatic connection using radio waves, the icon short cut in the glasses, shows the car's control panel, is available for gaze, and secondary input activation.

The activated control panel, and car each have a unique identifying computer code, that allow the car computer, and glasses computer, to assure the control panel, is the right control panel for the car, and is used for the matching car and glasses with each other. If the control panel doesn't match the car, the control panel won't function with the car.

The car computer, and glasses computer can each have their data encrypted, to limit other users from viewing their communication, to limit hacking of the car or glasses, and to limit operation of the car by other users' glasses.

f) The car control panel is activated from its saved space in the glasses' storage, when the user gazes, and secondary input activates the car icon on the map.

The activation of the car icon activates the computer to check in the storage to see if the control panel for the car is there, if it is, it uses the stored control panel, and doesn't download the control panel. The control panel isn't downloaded again, and or doesn't over write the same stored control panel.

The car and glasses can communicate with each other, either over the internet, with radio waves, infrared light waves, or a combination of the communication ways, like, transmitting over the internet, and receiving using radio waves.

On the map the car can graphically, and or with words show, that its available to be operated by glasses Connecting Through Different Company's Servers 1. The devices, and glasses can connect to each other, through different company's servers, with the different servers connecting to each other thru the internet. 2. The devices, and glasses can connect to each other through a single company's servers. 3. The devices, and glasses can connect to each other through both, the many of the devices, and glasses connected to different company's servers, and with many of the devices, and glasses connected to one company's server. With the one company's servers connected to many other companies' servers. With the different servers connecting to each other thru the internet Glasses Connecting to the Devices Through the Internet The glasses uses radio waves, to communicate wirelessly, with the devices. The glasses can communicate with the device through the internet. The glasses have a cell tower glasses transmitter and receiver, for connecting to a cell glasses tower.

The device connects to an internet router, either wirelessly, or wired. The device internet router connects, to a server for the device. The device server connects to the internet.

The glasses connect to a cell glasses tower. The tower connects to an internet router for the tower. The tower router connects to a web server for the tower. The tower web server connects to the internet. The device server connects to the tower web server, over the internet.

The device's server hosts the devices web page. The device, and glasses each, have a unique IP address (Internet Protocol address) to identify each other, over the internet. The addresses can be an IP address using IPv4 or IPv6. The Internet Protocol (IP) is the principal communications protocol in the Internet. A security software in each, the glasses, and device. can secure the connection between the glasses, and device.

The device, and glasses may both use their own internet service provider ISP, to access the internet. The ISPs may be part of an internet exchange.

The glasses, and device communicate with each other over the internet, using internet protocol language. The communication between client, and server takes place using the Hypertext Transfer Protocol (XHTTP), The communication can use MQTT which is a protocol for machine-to-machine and Internet of Things deployments. The communication can use CoAP which is aimed at one-to-one connections.

The IP address identifies the host, or its network interface, and it provides the location of the host in the network, and the capability of addressing that host.

The glasses, and device each have a unique DNS (Domain Name System). The DNS turns the glasses, and device domain names into unique Internet Protocol (IP) address. The glasses, and device each have a communication software.

The glasses can connect to the internet, by connecting to a cell glasses tower, with the cell glasses tower network connected to the internet. The glasses, and or device, or both broadcasts, on their respective servers, their availability to connect with each other. The glasses broadcasts, it's availability to connect to the device, and the device it's availability to connect to the glasses.

Automatically Connecting a Device to a Glasses by Using Radio Range, or Distance Determined on a Map A window on the glasses, shows the device's sent control panel. The panel can be shown as a small closed window, which take up 28 percent or less of the display, or a large open window, which take up 64 percent of the display, or 28 to 100 percent.

The small closed window, is opened by gaze, and secondary input activating the window, which also enlarges the control panel, where the panels inputs are large enough to be activated by gaze, and secondary input. The open large window, is displayed as being already open, with the panel's inputs being large enough to be activated by gaze, and secondary input.

The device, and glasses search for each other. The device detects glasses, that are broadcasting their ability to receive, the devices control panel. The glasses detect devices, that are broadcasting their ability to send, the devices control pane to glasses. The glasses may connect to the device first, or the device may connect to the glasses first.

Ways of Connecting the Device to the Glasses

Radio Wave Connection

The device, and glasses connect, when in radio range of each other, when either device detects Bluetooth radio wave frequency's, of the other device. The detection of Bluetooth radio, detect may depend on the range of the device, and glasses from each other, such as, 20 meters, in unobstructed view, or 10 meters when physical barriers, like, walls between the device and glasses interfere with the radio signal.

The device, and glasses scan the Bluetooth radio wave spectrum, until finding a radio identifier from the other device is detected. Each device, and glasses have their own address identifier, that shows, that it's control panel, is available for download.

Radio Wave Connection to the Internet Connection

The device, and glasses are each connected to the internet. The device connects to the internet, thru a wired connection, or radio wave connection that connects thru a wifi router, that is connected to the internet, using wifi radio wave, or connects to 3g or 4g or 5g radio waves, that connect to cell glasses network that allows connection to the internet. The glasses connect to cell glasses towers, with 4g or 5g or 6g radio waves.

The device, and glasses each connect to their own server on the internet, or to the same server on the internet. The servers connect to each other, thru the internet, connecting the devices. A map can be on a server, or on the device, or glasses, maps the location of the glasses, and device. When the device, and glasses are a specified distance, of like, 10 meters the map connects the device, and glasses to each other.

When connected, the device sends, the glasses, the device's control panel. The panel is displayed on the glasses. The elevator's panel is sent to the glasses. The user gaze, and secondary inputs panel input buttons, that glasses use to operate the device, with the panel, like, activating an operation of the elevator, for example, gaze, and secondary input activating the floor number 2, which requests the elevator move the elevator to the second 2 floor, which operates the elevator to move to the second 2 floor.

Storing Control Panel on Glasses

The control panel received by the glasses, is saved on the glasses. After the panel is saved, after the first down load, the next time the device, and glasses connect, the device asks the glasses, or the glasses tells the device, communicates whether the glasses have the device's control panel, and if the panel is the most recent, up to date panel.

If the device, and glasses detect that the glasses have the panel, the panel isn't sent to the glasses', and the glasses operates the device with the panel that is stored in the glass's storage, by displaying on the panel on the glasses display. If the glasses' panel isn't the latest panel the device sends the glasses, the latest panel, which the glasses store, over riding the latest up to date panel in stored in the storage.

Different Ways of Communicating with the Car and or Another Devices

The glasses can act as a control panel, by performing interactions with embedded systems located in its proximity. To support proximity-aware interactions, both the glasses and the embedded systems with which the user interacts have short-range wireless communication capabilities. Bluetooth, or Wi-Fi direct is used primary for the short-range wireless technology that will enable proximity-aware communication.

Since multiple embedded systems with different functionalities can be scattered everywhere, the glasses can automatically discover, or on-demand embedded systems located in the proximity of the user. This is done using a short-range wireless device discovery protocol.

At discovery time, the glasses learn the identity and the description of these systems. Each embedded system can provide its identity information (unique to a device or to a class of devices) and a description of its basic functionality in a human understandable format.

The user has pre-installed on the glasses, the interfaces for interacting with the embedded systems. An alternative flexible solution is to define a protocol that allows the glasses to learn the interfaces from the embedded systems themselves.

Dual Connectivity Model

A universal interaction architecture based on the glasses is the dual connectivity model, in which the user connects both to the close-by environment and to the rest of the world through the Internet. This model of interaction is based, on the communication capabilities incorporated in the glasses. They have the unique feature of incorporating short-range wireless connectivity (e.g., Bluetooth) and Internet connectivity (e.g., General Packet Radio Service GPRS) in the same glasses' personal mobile device.

The glasses are connected to a cell glasses network tower receiver, and transmitter. The glasses receive and transmits, data on the cell glasses network. This is the enabling feature for a secure and generic framework of services over these glasses' networks.

For example, an intelligent disabled user door opener equipped with a Bluetooth interface. This embedded system is very simple and is not capable of storing or transferring its interface to the glasses. However, it can identify itself to the glasses. Using this information, the glasses can connect to a server across the Internet to download the code of the interface that will allow it to become a detached input device for the door opener.

The glasses can also perform authentication over the Internet to ensure that the code is trusted. All further communication between this embedded system and the glasses happens by executing the downloaded code. This code will display on the touch screen panel that emulates the panel of the gas pump (i.e., it effectively transforms the glasses into an intuitive gas pump detached input device). Control panels can be downloaded from the web that can be downloaded and executed on the gas pump. For this purpose, the gas pump does not have to be connected to the Internet; it is the glasses that facilitates this action.

Another typical application is opening/closing an atm. The entry in certain atm's will be protected using Smart atms (e.g., atms that are Bluetooth-enabled and can be opened using digital atm keys). The dual connectivity model enables users carrying glasses to open these atms in a secure manner. The glasses can establish a connection with the lock, obtain the ID of the lock, and connect to an Internet server over GPRS to download: The connectivity is the code that will be used for opening the atm (a digital atm key can also be downloaded in the same time). The server hosting the interface and the keys for the Smart atm maintains a list of people that can open the atm. The identity of the glasses' user (stored on the glasses in the form of her personal information) is piggybacked on the request submitted to the server. If the server finds that this user can open the atm, it responds with the code for the interface and the digital key.

The dual connectivity model can also be used to implement electronic payment applications. The user does not need to know about a vendor's embedded system in advance. The glasses can authenticate the vendor using its Internet connection. The same connection can be used by the user to withdraw electronic currency from their bank and store them on the glasses. Another option provided by the glasses is to send some of the unused money back into the bank account (i.e., make a deposit each time the amount on the glasses exceeds a certain limit). Potentially, the vendor's embedded system can also be connected to the Internet. For instance, this ability can be used to authenticate the user.

Glasses Software Architecture

This architecture applies to all the proposed interaction models. In the following, is briefly describe the components of this architecture.

The Bluetooth Engine is responsible for communicating with the Bluetooth-enabled embedded systems. It is composed of sub-components for device discovery and sending/receiving data. Bluetooth Engine is a layer above the Bluetooth stack and provides a convenient Java API for accessing the Bluetooth stack. The downloaded interface is a Java program which cannot access the Bluetooth stack directly. It depends on the Java API provided by the Bluetooth Engine for communicating with the embedded device.

The Internet Access Module carries out the communication between the glasses and various Internet servers. It provides a well-defined API that supports operations specific to our architecture (e.g., downloading an interface). The protocol of communication can be either HTTP or TCP/IP (on top of GPRS).

Discovering the Embedded Systems

The proximity engine is responsible for discovering the embedded systems located within the Bluetooth communication range. If an interface for a newly encountered system is not available locally (i.e., a miss in the Interface Cache) or through direct communication with the system, the proximity engine invokes the internet access module to connect to an Internet server and download the interface for interacting with the device. The downloaded interface is stored in the interface cache for later reuse.

Together with the interface, an access control handler can also be downloaded. Such a handler executes before any subsequent executions of this interface. The proximity engine informs the execution engine to dispatch the downloaded interface for execution. All further communication between the glasses and the embedded system happens as a result of executing this interface.

The execution engine is invoked by the proximity engine and is responsible for dispatching the downloaded interface program for execution. The downloaded interface interacts with the bluetooth engine to communicate with the embedded system or with another glasses. This interface may also interact with the internet access module to communicate with the webserver. It may need to contact the webserver for security-related actions or to download necessary data in case of a miss in the personal data storage.

Storing the Code

Interface cache stores the code of the downloaded interfaces. This cache avoids downloading an interface every time it is needed. An interface can be shared by an entire class of embedded systems, like, elevators. Associated with each interface are an access control handler that executes before any subsequent invocation of this interface (It checks if the interface is still allowed to run, sets the permissions to local resources).

Personal data storage acts as a cache for "active data", similar to Active Cache. It stores data that needs to be used during the interactions with various embedded systems. Each data item stored in this cache has several handlers associated with it that can perform various actions (e.g., access handler, miss handler, eviction handler). Examples of such data include digital or electronic cash. Each time an interface needs some data, it checks this cache. If the data is available locally (i.e., hit) the program goes ahead; otherwise (i.e., miss), it has to use the internet access module to download the data from the corresponding server in the Internet.

Any embedded system is registered with a trusted webserver (the webserver is just a simplification, since this is in fact a web service distributed on multiple computers). At registration, the webserver assigns a unique id and a url to the device. All the information necessary to interact with the device along with a user interface is stored at that url. This url may be common for an entire class of embedded systems.

The interaction protocol that takes place when the glasses need to interact with an embedded system. The user invokes the proximity engine each time the user needs to interact with a device located in the proximity. Once the embedded systems in the proximity are identified, the user chooses the one they want to interact with. A request is sent to the embedded system to provide its id and url. Upon receiving the id and url of the embedded system, the glasses execute the access control handler and then loads and executes the interface. In case of a miss in the Interface Cache, the interface needs to be downloaded on the glasses either from the webserver or from the embedded system itself.

Trusted Interface Downloads

An interface downloaded from an embedded system is un-trusted and is not allowed to access to local resources on (i.e., sandbox model of execution where it can only execute commands on the device). The interfaces downloaded from the webserver are trusted; they are assumed to be verified before being distributed by the server.

The glasses request an interface for the id provided by the device (using the URL provided also by the device). With this request, the glasses also send its id (stored in the personal information storage). The glasses are granted permission to download an interface, subject to the access control enforced based on the glass's id and, potentially, other credentials presented by the user. Once the access is granted, the webserver responds with the interface needed for any further interaction with the device.

The data stored in the personal data storage can be classified into three categories: Description of the downloaded interfaces. The code of the downloaded interfaces is stored in the Interface Cache, but its description is stored in the personal data storage.

Every downloaded interface has an ID (which can be the ID of the embedded system or the class of embedded systems it is associated with). This Id helps in recognizing the cached interface each time it needs to be looked up in the cache. In addition to assigning an id, the access and miss handlers associated with the interface are also defined. For instance, the user might define the time period for which the interface should be cached, or how and when it can be reused.

Confidential Data

Example of confidential data include electronic cash or digital keys. Every confidential data item has a data-id and handlers associated with it. The handler's define a mechanism for evicting the data entity, sharing it across applications, or controlling the access to it. For instance, electronic cash can be sent back to the bank at eviction. The handlers also let the glasses user have control, over the confidential data stored on the glasses.

Any application that needs to access a confidential data item accesses it through the handler. The data item handler may either have an access control list of applications that are allowed to access it, or may pop up a choice menu to the user every time an application tries to access the data entity. Handlers are also provided for fetch data in from the corresponding server when it is missing in the cache.

Personal Information of a User

Personal information of the user in form of his name, credit card information, is stored in this cache. This information is used for authenticating the user to applications that require that level of security, such as the digital-key application mentioned earlier. Personal information is primarily accessed by the architecture components of the glasses. Applications may access this information through the handler associated with this data.

AR Headset Self Driving Car Operation

The map shows the user's 816 present location 842 on the map 822, as shown in FIGS. 4, and 5. The present location is shown by a figure, such as, a circle.

The user gazes, and gaze point 802 that contacts a point on the map 822, creates a destination location 834, on the displayed map in mid-air, that the user wants the car to move to, the user gazes at an icon, which moves a cursor 806 to the icon, highlights the icon, and thinks left click, or the word left click is said, at the highlighted icon, which activates the icon. The move to location is highlighted with a visual, clue, such as, a dot, or a flag, on the display. The user can move the dot to another location, by activating the dot, with gaze. The dot will follow the gaze to a location that is gazed at. The dot will stay at the other location, when the gaze is discontinued.

The mixed reality glasses 842, have an eye tracking sensor, and brain wave sensor, or microphone. The headset displays mid-air input icons. The eye tracker in the headset, allows a user's eye gaze, to highlight the input icons, and the user's waves, or spoken words, then activate the icon.

Detection of gaze by the gaze sensor, at the icon produces a visual change in the icon, such as, a highlight of the icon. Detection of specific thought, by the thought sensor 840, activates the highlighted icon, thought such as, click, or moving their tongue side to side, or microphone detecting the word enter being said.

The map has a destination location search icon 838. The activate search icon opens a search window. In the search window, is typed building addresses, names of business, types of establishments or businesses, and names of locations. The found locations are displayed on the map.

The user can type in a start location that maybe different from the present location 824, or present location, and a destination location, and different routes will be shown between the two locations. The user is shown with one or more routes, to the desired location, with recommended, and alternative routes 828. The user gazes at the route the user desires. The displayed chosen route 826 is highlighted, and thinking a enter thought, or the word enter is said, which activates chosen the route. A start travel icon is displayed.

The user gazes and thought, or spoken words, or hand gesture input, or facial gesture input, to activate start travel icon 830, and the car starts travelling the route. A stop travel icon 832 is displayed. The stop travel icon is highlighted by gaze. The user gazes 846 and thought or spoken words, or hand gesture input, or facial gesture input, to activate the stop travel icon, and the car parks safety out of the way of traffic by the activation the stop travel icon.

A movable destination location 818, can be placed on the map, by activating the movable location icon 818, with gaze and secondary input, and having the movable location icon move to a point on the map, by the icon following the gaze point to a desired destination. Routes to the movable location icon, are displayed when the icon is placed at the desired location. A voice icon 820 announces with sound, thru a speaker, the headset's 842 location. A compass icon 836 points to the north.

In another embodiment, a thought input device 840 is part of the headset, and connected to the computer in the headset. The user gaze 846, and thought or spoken words to activate the desired route. The user gazes, and directs thought at the route the user desires. The displayed chosen route 826 is highlighted. The start travel icon 830 is displayed. The start travel icon is highlighted by gaze. The user thinks yes at the highlighted start travel icon. The yes thought, or the word yes is said, which left clicks the highlighted start travel icon. The activated start travel icon, starts the self-driving car 810 travelling the selected route.

The stop travel icon 832 is displayed. The user gazes at the stop travel icon, which highlights it. The user thinks stop, and the highlighted stop icon is left clicked, activated, which activates the car 810, to automatically park safety out of the way of traffic.

If a pedestrian or vehicle is detected to close to the car, or on a course where the pedestrian or vehicle may contact the car, the pedestrian is highland on the display. The pedestrian or vehicle is viewable with a red flashing outline, halo around the pedestrian. The car's computer acts, to have the car avoid possible contact, with the pedestrian, or vehicle, or dangerous object, or going off the road. The car can automatically move, or stop to avoid the pedestrian. The user can use gaze, and a secondary input at the stop car icon to activate it, which turns off and stops the car, in an emergency. The pedestrian or vehicles are detected by sensors, radar, pedestrian or vehicle cameras and sensors as part of the car (not show), which are connected to the car computer.

The user can increase the volume of the radio, connected to the computer, by gazing, and thought or spoken words or hand gesture input, or facial gesture input, at the increase icon or decrease volume symbol of the radio by gazing at the decrease volume symbol icon. The user can view the volume of the radio on the volume indicator icon. The user can view a number icon of the radio station the radio is tuned to. The user can change the station, by gazing, and thought or spoken words at the radio station change station increase or decrease icon. The user can switch between the radio receiving amplitude modulation AM, and frequency modulation FM radio waves, by gazing, and directing thought, gestures, or spoken words at the change car component symbol icon.

The user can turn on the head lights by user gaze, and secondary inputs the turn on head lights icon (not shown). The user's input into the light icon is detected by the eye tracker, and connected computer. The computer activates the turn headlight on function. The computer sends instructions to the headlights switch to turn on the headlights. The light switch is switched to the on position, the lights are turned on.

The user can turn on the head lights by gazing, and thought or spoken words at the turn on head lights (not shown) with their gazing, and thought. The user's gaze contact with the light icon is detected by the eye tracker, and the connected computer. The computer activates the turn headlight on function. The computer sends instructions to the headlights switch to turn on the headlights. The light switch is switched to the on position, the lights are turned on.

Operating a Door Opener for Disabled Users with a Map on a Glasses Description

A Glasses Map Displays Door Openers

A glasses has a displayed map. The map has a search window. The map shows the floor that the user is on, a floor map of the of the floor. The building has a building computer, or the door opener has a computer, the door opener is part of the building. The door opener computer, may control one or many door openers in the building, and communicate with many different users' glasses, activating an opening of one or more doors, at a time, simultaneously. The glasses connect to the building computer.

Typed search results for devices, like, door opener for disabled users, show displayed icons associated to the door openers, at locations on the map, that are associated to the locations of the door openers. The openers icons visually describe pictorially, or in writing the openers, such as, a drawing of a door opener or the word door opener.

A route function is displayed, that when gazes at, and user sound input, or thought input, or hand gesture input, or facial gesture input, plots a route from the glasses to one of the door openers. The route follows hallways, stairs, and routes inside a building housing the door openers, that are accessible by walking. The user can active the door openers when they are in the same room as the door openers, or in a different room than the door openers.

Opening a Door

Gaze is directed at an input icon. A cursor follows the gaze point to the gazed at icon. The gaze highlights the icon. The cursor gives the user visual feedback, of where the user's gaze point is on the display.

A thought of a bird for 0.3 seconds, produces brain waves, whose detection by the brain sensor, is associated to, signaling the computer to enter, and activate the gazed at icon.

Or the highlighted icon is activated by a click sound produced by the tongue, whose detection by the microphones, is associated to, signaling the computer to enter, or hand gesture input, or facial gesture input, activates and activate the gazed at icon.

When one of the door openers icons is gazed at, the icon opens, the control panel, of the icon. The control panel displays a door opener open door control panel.

The gazed at, and voice, or thought, or hand gesture input, or facial gesture input, activated command, sent from the glasses, sends instructions to the building computer, like, gazed at, and voice, or thought activating the activation of the door opener, which opens the door, sends instructions to the building computer, to open the door. The received door open signal by the building computer, activates the building computer, to open or send power, to the motor that opens the door, upon which the door is opened. The door closes after a time period, for instance, after 1 minute the door closes.

Operating a Door Opener for Disabled Users with a Glasses Map Operation

Example of Door Operation

When the user and glasses are close to the door opener, like, 10 meters. The door opener's icon, on the glasses mid-air display is activated, by being gazed at, and voice, or thought, or hand gesture input, or facial gesture input.

The activated door opener icon activates, the displaying of the door opener's control panel. The user gazed at, and voice, or thought, or hand gesture input, or facial gesture input, the door opener open icon on the panel, on the glasses, and the door opens.

If two doors are side by side, one an exit door, and one an entrance door. A gps sensor on the glasses, and triangulation with cell glasses towers, and wifi receivers, and transmitters, are used to determine the user's location, of being inside the building or outside of the building. Also, cameras can view, if the user is inside, or outside, and active the corresponding door, when the door open icon is activated. If inside the building the door says exit door open, which when activated opens the exit door.

Or both doors can be displayed, with open commands for each door. The user picks the door that they want to open, activating either the exit, or entrance door command, or open command for the door. Bacteria is avoided by avoiding gazes at, and voice, or thought activates a physical door opener button switch, when using the glasses to activate the door open switch.

Finding and Operating a Gas Pump with a Glasses Map Description

Gas Pump Product Choices

Displayed commands on the glasses, include, octane of gas 87, 89, 91, 93, 94, price gas per or liter or gallon, pay with credit card or cash. pay with glasses wallet.

The mixed reality glasses receive feedback information, that is displayed on the glasses midair display, while the gas pump is operating, such as, how much gas is being pumped into the car, in liters, 27.4 liters, how much is the cost of the gas being pumped is, 5.23.

Robotic Placement of Fuel Hose

A robot at the fueling stations receives a request from the user to supply gas to the car. The robot visually detects, with a camera connected to the robot, the filling gas opening, and electronical directs a electrical mechanical apparatus to move the hose nozzle, into the gas tank fuel filler, when the robot detects that the gas cap is off, of the gas filler opening The fuel tank cap can be removed manually by the user, or by a opener inside the car that is operated by the user's hand, or by glasses gaze, and secondary input, activating a displayed cap off icon, that electronically, and mechanically activates, a car robot that opens, and removes the cap. The robot can communicate with the car, to open, and remove the gas cap, which the car does. The cap can be automatically replaced after the gas is fueled, by reversing the operation of the opening of the cap.

Finding and Operating a Gas Pump with a Glasses Map Operation

Finding the Gas Pump

The user gazes at, voice, gestures, or thought types in, gas pumps, in the search window, using the virtual key board. Gas pumps that are available for operation, by the glasses are displayed on the map. The user follows a route to one of the gas pumps.

Example of Gas Pump Operation

The glasses connects to the gas pumps, thru Bluetooth, or using the internet, thru a cell glasses tower. The user picks one of the displayed gas pumps, from many gas pumps. The user gazed at, and voice, or thought, or hand gesture input, or facial gesture input, activates the gas pump icon that's says pump number 3, to open the 3 pump's control panel.

The user's gazed at, and secondary input of user sound input, or thought input, or hand gesture input, or facial gesture input, activates the 87-gas octane icon, on the control panel, displayed on the glasses, and the 87 is highlighted. The pump is turned on. The user pumps the 87 gas into a car, with a gas hose nozzle, that is connected to the gas pump and car. The amount of gas requested, is 12.00 worth of gas, or to fill up the tank. When the requested amount of fuel, is delivered, the gas pump stops the flow of fuel, to the car.

When the user stopping fueling filling the car's gas tank, the car's price, for the gas is displayed on the glasses. The user gazed at, and voice, or thought, or finger gesture, or facial gesture, activates a pay gas icon, and an input payment method is displayed. The user chooses to pay with credit card or debit card. The user pays by gazed at, and voice, or thought activates the credit card pay icon, a credit card on the glasses is charged for the payments.

Gas Pump

The user uses the interactive input display, to operate a gas pump. The user can activate the pump's input icons, by gazing at, and voice, or thought activates the displayed icons. The user gazes at, and voice, or thought, or hand gesture input, or facial gesture input, activates the gas pump input icons, to choose the octane of gas, or pay for the gas. The activated icons, are displayed, are associated with the operation of the pump, and activate gas pump functions, such as, delivery of gas, or payment of the gas. The mixed reality glasses receive, and displays feedback information, while the device is operating, such as, how much gas is being pumped, into the car.

Finding and Operating an Electric Car Charging Station with a Glasses Map Description Glasses have a displayed map. The map has a search window.

Gazed at, and voice, or thought, or hand gesture input, or facial gesture input, of a virtual keyboard, type search results for devices, like, electric car charging station, electric car fueling station, show displayed icons associated to the devices, at locations on the map, that are associated to the locations of the charging station. The charging station icons visually describe each icon pictorially, or in writing the charging station, such as, a drawing of a charging station, or the word charging station is spelled. The user can view, the car fueling, charging stations on the mixed reality glasses.

Charging Station Product Choices

Displayed commands on the glasses, include, start charge, stop charge, do you need more time, yes no, pay with credit card or cash. pay with glasses wallet. Choose your connector, SAE Combo, CHAdeMO. Choose level 1 change, 2, 3 DC fast charge. The car and station are equipped with a wire or Bluetooth or infrared light, which allows the station and car to communicate with each other, when they are in close vicinity with each other.

Charging Station Feedback

The glasses receive feedback information, that is displayed on the glasses, while the charging station is operating, such as, how much voltage is being charged to the car's batteries, 120 volts, 240 V, direct current DC fast charge, the percentage change of the batteries, time till fully changed or 100 charged, how much the cost of the electricity, being charged to the batteries is.

Finding and Operating an Electric Car Charging Station with a Glasses Map Operation Finding the Charging Station Gazes at, and voice, or thought, or hand gesture input, or facial gesture input, activates, the user types in electric car charging stations, in the search window, using the virtual key board. Charging stations that are available for operation, by the mixed reality glasses are displayed on the map. The user follows a route to one of the charging stations.

Example of Charging Station Operation

The glasses connects to the electric car charging station, thru Bluetooth, or using the internet, thru a cell glasses tower. The user picks one of the displayed charging stations, from many charging stations. The user gazes at, and voice, or thought activates the charging station icon that's says charging station number 3, to open the 3-charging station's control panel.

The user connects a charging wire from the charging station to the car. The charging station is turned on. The user gazes at, and voice, or thought, or hand gesture input, or facial gesture input, activates the 240V icon, displayed on the glasses, the 240V icon is highlighted, and the 240V delivery system is activated. The user gazes at, and secondary inputs, the start button, displayed on the glasses in mid-air, and electricity starts flowing from the station to the car, until the car's batteries are 100 percent charged, or another percentage of the user's choosing, or until the user stops the charging, by gazes at, and voice, or thought activates the stop button displayed on the glasses, which stops the electricity's flow to the car's batteries. The amount of gas requested is 12.00 worth of electricity, or to fill up the battery. When the requested amount of electricity, is delivered, the charging station stops the flow of electricity to the car. The user pays by gazing at, and voice, or thought activates the credit card pay icon, the credit card on the glasses is charged for the payments.

Charging Station Interactive Input Display

The glasses receive, and displays feedback information, while the device is operating, such as, how much electricity is being charged to the car's batteries.

Finding and Operating a Hydrogen Car Refuelling Station with a Glasses Map Description Charging Station Product Choices Displayed commands on the mixed reality glasses, include start charge, stop charge, do you need more fuel, yes or no, pay with credit card or cash. pay with glasses wallet. Choose your amount of hydrogen to be fueled, half fill H35, or full fill H70, or money amount.

The user can choose between, filling the tank, by choosing H70, or filling the tank half way, with pressurized hydrogen, by choosing H35, 350 bar (35 MPa) 5,000 psi, or H70, 700 bar, (70 MPa), 10,000 psi Fueling Station Feedback The glasses receives, and displays feedback information, that is displayed on the glasses in midair, while the fueling station is operating, such as, price 4.19 kg, sale 6.74, vehicle fueling in progress, press stop fueling to stop hydrogen fueling, hose pressure 3826.74 psi, vehicle tank data temperature 72.86 c, pressure 6017.40 psi.

Shown on the glasses, is the flow rate of hydrogen going into the fuel tank. The percentage of fuel in the car's tank, time till fully filled tank, or half-filled tank, the cost of the hydrogen that has already been put in the car's tank. The hydrogen fueling station can cars, and also fuel trucks, airplanes, helicopters, motor cycles, mobile homes, boats, and buses.

Finding and Operating a Hydrogen Car Refuelling Station with a Glasses Map Operation Finding the Charging Station The user types in hydrogen car fueling stations, in the search window, using the virtual key board. Refueling stations that are available for operation, by the glasses are displayed on the map. The user follows a route to one of the fueling stations.

Example of Hydrogen Fueling Station Operation

The glasses connect to the hydrogen car charging station thru radio waves, Bluetooth, or using the internet, thru a cell glasses tower. The user picks one of the displayed charging stations, from many charging stations. The user gazes at, and voice, or thought, or hand gesture input, or facial gesture input, activates the fueling station icon that's says charging station number 4, to open the 4 station's control panel.

The user connects a hose nozzle, and wire that's part of the hose, from the fueling station to the hydrogen car, and car's hose and wire connector respectable. The hydrogen fueling station is turned on, and fuel starts flowing to the car. The wire or the car and station are equipped with Bluetooth or infrared light, which allows the station, and car to communicate with each other.

The user gazes at, and voice, or thought, or hand gesture input, or facial gesture input, activates the H35 icon, the H35 icon is highlighted, and the H35 delivery system is activated.

The user gazes at, and voice, or thought activates the start button, displayed on the glasses, and pressurized hydrogen starts flowing from the station to the car, until the car's tanks are 100 percent full, or another percentage of the tank's volume, of the user's choosing, or until the user stops the fueling, by gazing at, voice, gesture, or thought activates the stop button displayed on the glasses, which stops the hydrogen's flow to the car's tanks.

The amount of hydrogen requested is 12.00 worth of gas, or to fill up the tank. When the requested amount of hydrogen fuel, is delivered, the hydrogen fueling station stops the flow of fuel, to the car. The user pays by gazing at, and voice, or thought activates the credit card pay icon, the credit card on the glasses is charged for the payments.

Fueling Station Feedback

The charging station may send the glasses, information on the progress, of the car, and station's interaction, such as, the price of hydrogen per kilogram 4.19 kg, amount of purchase sale 6.74 total amount, amount of fuel being fueled in progress, start fueling to start fueling, press stop fueling to stop hydrogen fueling, hose pressure 3826.74 psi, vehicle tank data temperature 72.86 c, vehicle tank pressure 6017.40 psi.

The car tank may have a capacity of 6.4 kg of compressed hydrogen, the tank can be filled with any amount up to the capacity of the tank. Communication between the car, and station, may be, infrared, Bluetooth, or by the wire attached to the fueling hose.

The glasses receive and displays the feedback information, while the device is operating, such as, how much hydrogen is being pumped into the car's hydrogen storage tank, showing the pressures of the car's tank, like, 4000 pounds per square inch psi.

Operating an Elevator with MR Glasses Map Description

MR Glasses have a Displayed Map

Figure 9:
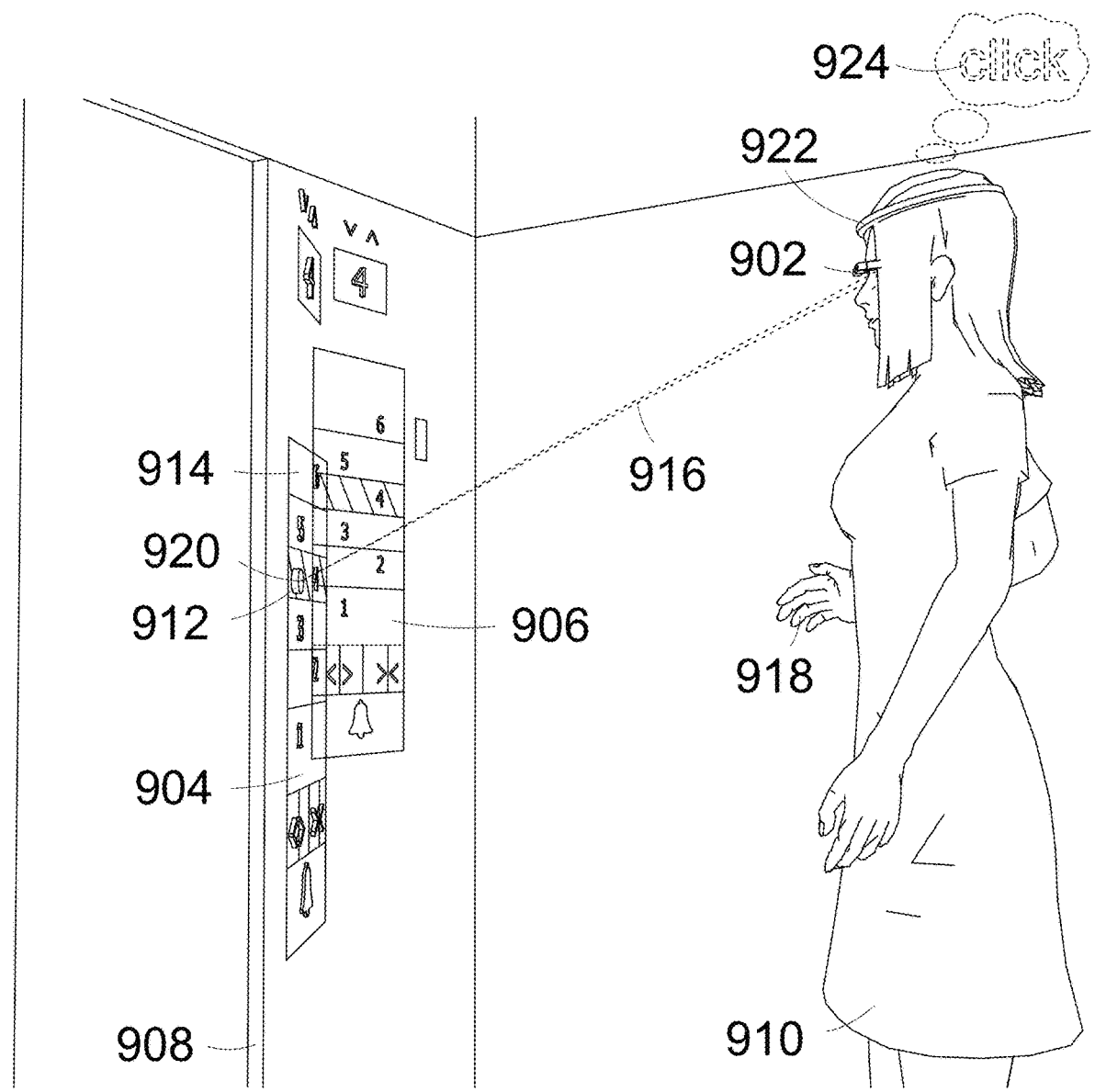
FIG. 9 shows a perspective view, of an AR reality headset having an eye tracking device, secondary input devices and an augmented reality input display displayed in mid-air, used to operate an elevator.

Mixed reality mr glasses 902 have a displayed map, as described in FIG. 9. The map has a search window. The glasses connect to a sever on the internet. The server has locations of elevators, and other devices like, gas pumps, store check machines, plotted on the map. The glasses map has a virtual keyboard.

Gazed at, and voice, or thought, or hand gesture input, or facial gesture input, of a virtual keyboard, type search results for devices, like, elevator, show displayed icons associated to the devices, at locations on the map, that are associated to the locations of the, devices, and elevators. The elevator icons visually describe pictorially, or in writing the elevator, such as, a drawing of an elevator, or the word elevator is spelled.

A route function is displayed, that when gazes at, and voice, or thought activate, plots a route from the glasses to the elevator. The route follows roads, and routes inside a building housing the elevator, that are accessible by car, and or walking.

Gazes, and Voice, or Thought Activates

A cursor is located at the eye gaze point 920, on the display. Gaze is directed at an input icon. A cursor 912 follows the gaze point 920 to the gazed at icon. The gaze highlights the icon. A thought of a bird for 0.3 seconds, produces brain waves, whose detection by the brain sensor, is associated to, signaling the computer to enter, and activate the gazed at icon.

Or the highlighted icon is activated by a click sound produced by the tongue, whose detection by the microphones, is associated to, signaling the computer to a enter command, and activate the gazed at icon.

The computer is connected to either, a microphone, finger gesture recognition sensor, facial gesture recognition sensor, or a brain wave sensor 922. The microphone, detects a specific sound, made by the user as an input. The finger gesture recognition sensor, detects a specific finger gesture, made by the user as an input. The facial gesture recognition sensor, detects a specific facial gesture, made by the user as an input.

The brain wave sensor, detects a specific brain wave thought. The thought is associated to, interpretated as an input of the cursor, that in contact with an input icon activates the icon, such as, thinking the word click 924, clicks the cursor. Brain waves associated to concentration, can also be used as an input, such as, concentrating on any word, or thing, or a word like 'activate' can input the cursor. Brain waves associated to body movements, like, moving a finger, can be associated to a click input of the cursor.

Connecting Glasses to the Elevator

Gazes at, and voice, or thought, or hand gesture input 918, or facial gesture input, activates of a chosen elevator, signals the server to connect the glasses to the elevator's computer, through the server. The glasses 1802 asks the elevator 908, for the elevator panel. The elevator can also automatically, send the panel to the glasses when they connect.

The glasses broadcasts, and receives radio waves. The glasses connect to the internet, or to the elevator using radio waves.

The elevator broadcasts and receives radio waves, and can connect to the internet, or to the glasses using radio waves. The glasses have a glasses computer, and the elevator has an elevator computer.

The glasses and elevator can also communicate, when they are within radio wave range of each other. The glasses and elevator communicate with each other, when they are connected.

Glasses Displaying Elevator Control Panel

The elevator detects when the glasses, and elevator connect and communicate with radio waves. With the detection of communication signals by the elevator, the elevator sends to the glasses 1802, a virtual facsimile of the elevator's physical control panel 906, or the elevator automatically sends the panel 906 to the glasses.

The received panel is displayed in midair. The panel shows icons that are available for the user to activate with gazes at, and voice, or thought, or hand gesture input, or facial gesture input, activates, that will affect the operation of the elevator. The gazes at, and voice, or thought activates one of the displayed elevator operation icons, signals the elevator's computer by the glasses' computer, to activate the elevator operation that is associated to the activated operation icon.

A Control Panel Outside of the Elevator

A control panel on the glasses, outside of the elevator, is used to call the elevator 908 to the floor the user is on. The physical control panel, and glasses control panel are the same, and show the same interactions, input by the user. The activated virtual icon, activates the physical displayed icon. Activation on the virtual display, is also displayed on the physical display.

The glasses and elevator system determine the floor the user is on, by using elevator cameras viewing the floor that the user is on. A glasses camera, viewing an image of a displayed number near the outside of the elevator that says what floor the user is on, the viewed number is interpreted as the floor that the user is on. GPS in the glasses, elevator, and or cell tower triangulation, or range from Bluetooth or WIFI radio transmitters in the elevator, can be used to find the user's floor, or the elevator that the user is in. The glasses are sent the control panel for the floor that the user is on.

The Glasses Connects to the Elevator, with Bluetooth or WIFI

Call elevator control panels (not shown) outside the elevator, which are on different floors, each have, and are connected to a bluetooth, cell glasses or Wi-Fi Direct radio transmitter and receiver. The control panels connect to one, or more elevator computers. The elevator computer directs the operation of the elevator.

The elevator has a call, up or down button, and physical call buttons, located outside of the elevator, on a floor that the elevator doors open to. To call the elevator, the user activates either the up or down button, by gazes at, and voice, or thought, or hand gesture input, or facial gesture input, activates either the up or down button on the gazes at, and voice, or thought activates the button on the glasses mid-air display screen.

Elevator that Moves is Many Directions

The call box displays an either up or down icon, for movement up or down. If the elevator goes sideways the box can also display a left, right forward or back icons; for movement left, right forward or back. Activation of the up icon signals the elevator going in the up direction to stop at the floor the user is on, like, the 5th floor, and allow the user to board the elevator.

Inside the Elevator

When in the elevator, the user actives the icons that control the operation of the elevator, while inside the elevator, like, activating the 2 icons, which instructs the elevator to move to the 2nd floor. The activated elevator command signals, the elevator to active the elevator operation, associated to the command.

Commands include, basement floors, parking, ground floor, 1, 2, 3, 4, 5, 6, 7, 8 etc., close door, open door, emergency button, user help call, elevator stop, start, and fan. The number 1 elevator operation moves the elevator to the 1st floor. The open-door operation opens the door of the elevator. The stop icon stops, the elevator.

The commands are self-explanatory, descriptive of their association to the operation of the elevator, that they are associated to, such as, the fan button, when activated turns on the fan, when the fan is off, or turns off the fan, if the fan is on.

A physical elevator control panel 906, and user's glasses control panel are located inside the elevator. The inside elevator physical control panel 906, and glasses control panel 914 are the same, and show the same interactions, input by the user 910.

The glasses are sent the control panel, for the elevator that the user is in. The glasses, and elevator determine the elevator the user is in, by using elevator cameras viewing the elevator that the user is in. A glasses camera, views an image of a displayed number inside of the elevator that says what elevator the user is in.

The elevator displays the menu, control panel on the elevator 908, The menu includes, elevator control panel commands. The menu, and control panel is also displayed on the glasses display. The elevator's displayed menu, is cloned to the glasses' display. The cloned elevator display menu, which includes, elevator control panel commands 914, like, move to 9 floor, on the glasses. The glasses elevator control panel commands 914, are interactive with gazes at, and voice, or thought activates the menu, and menu commands, as is the elevator's menu interactive with gazes at, and voice, or thought activates the menu, and menu commands.

Icons Give Visual Feedback

The control panel can be enlarged or minimized by the user's gazes at, and voice, or thought activated. The icons give visual feedback, that they are being gazes at, like, increasing luminosity. The icons give visual feedback, that they have been activated, such as, changing color, dimming, changing shape, moving, decreasing in size, moving farther away from the user, and showing text. The icons can change colour, or size, when being activated, or gazes at, and voice, or thought activated.

The input icons can be visually pleasing, such as, being similar to a rabbit, a flower, and a person's face. The user can set, and input the shape, avatars, movements, activation actions, and colors used for the buttons.

Positioning the Elevator Input Buttons on the Glasses' Display Screen

Many devices menu can be displayed, in the display near each other, such as, displaying a vending machine menu, an elevator call button, and an automatic teller machine.

The inside of the elevator, and outside elevator input panel has software operating instructions, for the various functions and devices of the elevator. The elevator instructions are displayed on the menu by the gazes at, and voice, or thought activated.

Operating an Elevator with a Glasses Map Operation

Finding the Elevator

The user connects to the internet thru the mobile glasses network, or thru a WIFI connection, as described in FIG. 9. The user gazes 916 at, and voice, or thought, or hand gesture input, or facial gesture input, activates types in elevators, in the search window, using the virtual key board. Elevators that are available for operation, by the glasses are displayed. The displayed elevators show a description, of the elevators, such as, the floors being used by the elevator, like, 5-8 floors.

The user gaze, and secondary input activates, chooses one of the elevators and chooses to have directions and routes to the elevator shown. The routes include the time to the elevator, by car, waking, and public transportation, bus, or subway. The user follows one of the shown routes, to the building with the elevator.

Route Inside the Building

Inside the building, the user follows the route, on the map of the building to the elevator. The map includes, the route on a 1st floor, and stairs to take to the floor that the elevator is on, such as, 2nd floor. Once on the 2nd floor, the map shows a 2nd floor map with route to the elevator.

Example of Elevator Operation

When the user is close to the elevator, such as, 40 meters. The elevator icon is activated, by gazes at, and voice, or thought, or hand gesture input 918, or facial gesture input, activated, by the user 910. The virtual elevator control panel 604, outside call buttons, and inside control panel are displayed on the glasses display.

Elevator Calling Button Outside the Elevator

Virtual buttons in midair include, up or down buttons, ranges from, like, floor 8-14 or floor 1-7, 904. The user gazes at, and voice, or thought activates the up button, while on the 1st floor. The up-button changes from an orange color, to a green colour, to signal that the up button us activated. The glasses show the floor numbers that each of the different elevators are on. The elevator going up stops, and the elevator door opens, allowing the user to enter the elevator.

Inside the Elevator

The letter associated to the elevator control panel is displayed automatically. The user can also manually choose the g letter elevator panel from the display, which shows all the elevators, and the letters associated to each elevator, like, d, e, f, g. The elevator letter g is displayed inside the elevator.

The user gazes at, and voice, or thought, or hand gesture input, or facial gesture input, the cursor 912 in contact with the 4th floor input icon, activates the 4th floor icon 912, and the doors start to close. The user gazes at, and secondary inputs, the door open icon, to stop the door from closing, reopen the door, to allow another passenger to enter the elevator. The user gazes at, and secondary inputs, the close door icon, and the elevator doors close. The elevator moves to the 2nd floor. The elevator doors open, and the user vacates the elevator. At 20 meters from the control panels, the panels are removed from the glasses display.

Operating a Vending Machine with a Display Description

A vending machine menu, on an AR glasses display, is displayed in mid air. The menu visually describes pictorially, or in writing, the vending machine, such as, a drawing of a vending machine, or the word, vending machine is spelled, and displayed.

The menu display, can be input buttons, associated to menu sign commands, and or commands on an electronic display, by the button's location being near the sign.

Vending Machine Product Choices Commands

Displayed commands include, pay with wallet, potato chips, corn chips, chocolate bar, water, cherry gum, cookies, hot dog, pizza, popcorn, sprite soda, coke, pretzels, cake, cheetos, mints, and ice cream.

Hardware

A computer in AR glasses, is connected, to an eye gaze detecting sensor, in the glasses. The eye gaze detecting sensor, detects the user's eyes gaze point location on a display of a menu for a vending machine vending machine, displayed in midair. A cursor is located at the eye gaze point, on the display.

The computer is connected to either, a microphone, finger gesture recognition sensor, facial gesture recognition sensor, or a brain wave sensor.

The microphone, detects a specific sound, made by the user as an input. The finger gesture recognition sensor, detects a specific finger gesture, made by the user as an input. The facial gesture recognition sensor, detects a specific facial gesture, made by the user as an input.

The computer is connected to a display. The computer is connected, to the vending machine. The display show input icons, that each describe one of the different, operations of the vending machine. Activation of an icon, is associated to activating the operation of the vending machine, that the icon describes.

An icon is activated with the cursor, in contact with the input icon and a detection of input of from the user. The user input can be either a sound, a finger gesture, a facial gesture, a brain wave thought.

The icon can illuminate, when the cursor contacts the icon. The cursor over lays, is super imposed on the icon. The display shows an input button, an image that describes, the operation of the device that the button is associated to.

Operating a Vending Machine with a Display Operation

The vending machine shows a description, on the display, of the vending machine's products, such as, like, chips, soda, ice cream, candy, coffee, pizza, hamburgers.

Example of Vending Machine Operation

The user picks, by gaze moving a cursor to a desired machine, of many displayed vending machines, and secondary inputs. The desired machine's control panel icons are display. The user gazes at an icon, that's say chips, and secondary input of user sound input, or thought input, or hand gesture input, or facial gesture input, activates the chips icon. The activated chip icon delivers the chips to the user.

The laser panel displays, potato chips, chocolate bar, water, cherry gum, cookies, hot dogs, pizza, popcorn, sprite soda, coke, pretzels, cake, cheese chips, mints, ice cream. The user touches the potato chip icon, and the price for the chips is displayed. The user touches the wallet pay icon and pays with a digital wallet on the display. The chips are delivered for the user to retrieve.

Vending Machine

A vending machine menu displays food, chips, drinks, candy for sale. The user gazes at an icon, moves cursor to the icon, highlights the icon, and thinks left click, or says yes, or moves a finger forward, or opens their mouth, at the highlighted icon, at the displayed chips icon. The gazed, and user input at the icon activates it.

The user pays for the chips, by opening their electronic commerce account, by using facial identity recognition, with an activation of a facial identity recognition pay icon, that identifies the user, with facial recognition, ounce identified, and online account linked to the identification, is opened, and transferring funds from their account to the vending machine. The machine accepts the funds, and delivers the chips.

The user can also pay, the vending machine, with funds having been downloaded to the display, and which are displayed on the display, and are gaze, and secondary user input inputted, and sent to the vending machine.

Operating a Smart Toilet with a Glasses Map Description

A Glasses' Location and Smart Toilet is Displayed on an Internet Map on the Glasses Mid Air Display Smart toilet is typed into the search window. Smart toilet locations are plotted and displayed on the map. The displayed smart toilets are shown as icon representative of the smart toilet.

An activated displayed icon command activates a smart toilets operation associated to the icon command, for example, gaze, and secondary input of a smart toilet icon command activates the command being gaze, and secondary inputted, for example, activation of a displayed increase water temperature icon, activates the increase water temperature operation of an electronic bidet in the smart toilet, the increased water temperature operation increases the water temperature of the water flowing from the bidet, as illustrated in FIG. 8.

An activation of a decrease water temperature icon activates, the decrease water temperature operation of the bidet in the smart toilet, the decreased water temperature operation decreases the water temperature of the water flowing from the bidet. The commands can be displayed as being on a scale of 1-10, with 10 being the highest temperature.

An activation of a back-wash icon 142, sets the back wash water position, and activation of a start icon activates, the back-wash operation of the bidet in the smart toilet, the back-wash operation directs water flowing from the bidet at the user's back elimination position, anus. An activation of a front-wash icon 140 activates, the front-wash operation of the bidet in the smart toilet, the front-wash operation directs water flowing from the bidet at the user's front elimination position, female bladder opening.

Other commands associated to an operation of the bidet, and the operations description, include, water pressure increase, water pressure decrease 136, oscillating water spray pattern, and pulsating water spray, warm wash 134, hot wash, cool wash, start, stop, bottom dryer temperature increase, bottom dryer increase air flow.

The Smart Toilet Sends Information to the Glasses

The smart toilet sends information to the glasses, about the operations of the toilet, which is displayed on the display, such as, water temperature, water pressure 132.

The displayed data keeps the user informed, about the toilet's operation, and interaction with the user. The user can use the displayed toilet data, to adjust the operation of the toilet, such as, gaze, and secondary input increasing the time of the front wash, decreasing the waters pressure, decreasing the waters temperature, and changing the oscillating water spray, water spray pattern, and pulsating water spray.

Gaze, and Secondary Input Screen Input

The user can input, using the gaze, and secondary input screen, one of the input icons, letters, words, and written phrases, of the display menu.

The user gaze, and secondary inputs, with their finger, the icon command they want to activate, such as, gaze, and secondary imputing a front wash input icon, the front wash input icon is highlighted, the icon is left clicked, the icon command is activated, the front wash operation of the bidet is activated, and bidet washes the user's front of their posterior. The user can active another command, after the first command is activated.

The routes show a route for the toilet, to the building with the toilet, and route inside of the building housing the toilet. With the routed mapped, plotted to a map of the inside of the building. The user follows one of the routes to the smart toilet.

With multiple smart toilets, each smart toilet is assigned, a number, or letter, or designation for each smart toilet, like, 1, 2, 3, or a, b, c, d. The user gaze, and secondary input chooses the smart toilet that they want to use, from the display smart toilets.

The glasses using the locations devices, like, gps, radio waves, to determine which toilet the user is occupying. The toilet and glasses can also automatically display the toilet's control panel, for the toilet in the toilet stall that the user has entered. The automatic panel displays the panel with the letter associated to the toilet the user is occupying.

The chosen smart toilet sends the user's glasses control panel for the chosen smart toilet. The panel shows the toilet associated to the panel, namely, the letter d toilet. Each smart toilet has a control panel that is specific, to the smart toilet, and operates that specific smart toilet.

The glasses' computer directs the smart toilet's computer, to carry out the input request of the user. For example, the user gaze, and secondary imputes the back-wash icon. The back-wash input is detected by the sensor and the computer. The glasses' computer directs the smart toilet computer, to start a bidet backwash.

A camera in the glasses, can view the toilet urinal in front of the user, or toilet stall the user has entered, and detect a number displayed on the toilet, such as, number 8. The number 8 toilet is associated and connected to the glasses. A toilet computer is connected wirelessly to, and communicates with a glass's computer in the glasses.

Operating a Smart Toilet with a Glasses Map Operation
Finding the Smart Toilet

The user connects to the internet thru the mobile glasses 4 G is the fourth generation of mobile phone technology connecting to microwave towers. or 5G network, or thru a WIFI connection as illustrated in FIG. 8. The user types in smart toilets in the search window with on the virtual key board. Available smart toilets that are available for operation, by the glasses are displayed. The displayed smart toilets show a description, of the smart toilets, such as, the time of operation.

The user gaze, and secondary input chooses, one of the smart toilets, and chooses to have directions and routes shown to the smart toilet. The user follows one of the routes to the building with the smart toilet.

Inside the building the user follows the routed on the map of the building to the smart toilet. The map includes a 1st floor, and elevator to take to the floor that the toilet is on, such as, 3rd floor. Once on the 3rd floor the map shows a 3rd floor, map with route to the toilet.

The routes include the time to the smart toilet, by car, waking, and public transportation, bus, or subway. The directions and routes are displayed.

When the user is close to the smart toilets, like, 20 meters. The smart toilet icon in mid-air, is activated by gaze, and secondary input by the user. Four toilets are displayed, each labeled with a letter like, a, b, c, d. The user chooses the letter d toilet. The d toilet d control panel is displayed with the letter d displayed, on the panel. The smart toilets control panel 130 is displayed on the display, and is associated to an operation of the d toilet.

Example of Toilet Operation

The user gaze, and secondary inputs the front wash icon, the warm wash icon, the low-pressure icon, stop icon. The activation of the front wash icon, instructs the bidet to direct water to the user's front position The bidet directs water to the user's front position. The user gaze, and secondary inputs the increases temperature icon. The water temperature is increased, and the time of the water being sprayed is increased. The water stops when the, stop icon is activated, or the user vacates the toilet seat, or the displayed time is ended. The user gaze, and secondary inputs the air dryer, which starts the air dryer. The user vacates the toilet.

The user uses gaze, and secondary input to activate a back-wash icon displayed on the glasses' display. The activation of the back wash icon, instructs the bidet to direct water to the user's back position The bidet starts the directing of warm water, at the user's back position. The toilet's display, shows the operation of the toilet 144, doing the warm water, and back wash operation.

Example of Backwash

The user looks at the backwash icon. The cursor moves to the icon. The backwash icon highlights. The user thinks enter, or the word enter is said, or moves a finger forward, or opens their mouth, while looking at the icon, and the back wash icon is left clicked, and activated.

The activation of the back-wash icon, is associated to a command, to activate of the back-wash function of the toilet. The computer sends the toilet, the activated back wash function to the toilet. The toilet actives, the back-wash function of the toilet. The user is washed, with water directed at their back position, as they sit on the toilet.

Operating a Self-Serve Store Checkout Machine with a Glasses Description

Users Waiting to Use the Checkout Machine

With multiple self-serve checkout machines, each checkout machine is assigned, a number, or letter, or designation for each checkout machine, like, 1, 2, 3, or a, b, c, and d. The user gaze, and secondary input chooses the checkout machine that they want to use, from the display checkout machines.

Automatically Determining which Checkout Machine, the User Wants to Use

The glasses use the device's locations, gps, wifi, cell tower triangulation, to determine which checkout machine the user is in front of. When its determined which checkout machine the user is in front of, the checkout machine can send the glasses the panel, and the glasses can automatically display the checkout machine panel for the checkout machine that the user is standing in front of. The automatic panel displays the panel with the letter, associated to the checkout machine the user is occupying.

The checkout machine can also use the facial recognition to identify the user, viewing the user thru the camera on the glasses. The identified user is viewed, by a checkout machine camera positioned to view users in front of the checkout machines, to determine which checkout machine the user is standing in front of. By using the facial recognition to identify the user in front of the checkout machines, and then send the panel for the machine, where the user and machine is located.

A camera in the glasses, can view the machine in front of the user, and detect a number displayed on the machine, such as, number 8. The number 8 machine is associated to the glasses. A store computer is connected wirelessly to, and communicates with a glasses computer in the glasses.

The glasses control panel is displayed for the checkout machine, that the user is in line for. If the user changes lines, the control panel will change to the line the user is in. The line for the checkout machine the user is going to use, is assigned a number on the panel, and the same number on the machine, that the user can view.

The user can also manually change the checkout that they want to use, by gaze, and secondarily imputing a different checkout number icon.

The gaze, and secondary input screen on the glasses' screen can be used to shop in a store, without interacting with a store employee. The user can self-serve checkout at a self-serve checkout station, by using gaze, and secondary input to activate input items on a store self-serve check out pay station.

Store Commands

Store input icon commands correspond to operations of the checkout station like, enter, cancel, look up vegetable or fruit item, bananas, or celery. Pay for order with debit card, or credit card, or cash, or donate to charity.

The gaze, and secondary input, inputs the number 7 icon, and the 7 is activated. The 4 is used to type, a personal identification number PIN, into the computer. A 2 number can be gaze, and secondary input, to input the amount of 2 oranges the user has, when asked by the checkout how many oranges the user has.

The glasses' gaze, and secondary input screen displays, the checkout station control panel. The user checkouts using a barcode scanner incorporated into the checkout station, by scanning the items barcodes with the checkout station barcode scanner. The user can also checkout using a barcode scanner incorporated into the glasses, by scanning the items barcodes with the glasses barcode scanner.

The scanned items, and prices of the items, are put in an order, containing the products that the user is purchasing. The order is displayed on the glasses' display. The prices of the products are added, together to calculate a total price for the products.

Store items can include, socks, milk, bread, coffee, shoes, multi vitamins, bread, toilet paper, mints, gum, frozen vegetable, bananas, apples, orange juice, hot dogs, cat food, dog food, car oil, pants, shirts, candles, note books, jackets, shorts, tennis rackets, hamburger, salmon, dish washing soap, potation chips, chicken soup, spinach, canned beans, bran cereal, potatoes, onions, avocados, celery, mushrooms, blueberry pie, pizza, french fries, and ice cream.

The user can pay for the items on the display with a credit card that is stored on the glasses, and shown on the glasses' screen, with a store credit card reader. The items anti-theft devices connected to the items, can be turned off after payment.

The camera in the glasses, can view the items before payment, to make sure the user hasn't made a mistake with the number of items, and that all items have been charged. If a mistake is detected the glasses audibly or visually displayed by the glasses, to alert the user of the mistake.

The checkout process is monitored by store employees, who view the process on store display screens, and view the same screen that the user gaze, and secondary inputs, and viewed by the user. The user could also pick items, record their barcode on the glasses, have robots assemble the order, and at checkout have the recorded items brought to them.

The user can also gaze, and secondary input with their fingers, detected by and gaze, and secondary input screen at the one of the displayed items, that they want to activate, such as, the enter input icon command, the enter icon command is clicked, and activated.

The mobile device computer and external devices use a universal software enabling the communication between the mobile device computer and the external devices. The mobile device computer, and devices use a universal software platform of software, and hardware, which allow the devices computer to communicate with the glasses' computer.

The products can be equipped with anti-theft devices, that signal that they haven't been purchased, and if the user leaves the store without paying, a visual or audible alarm would be activated, that would signal store employees, to check the items the user has. The order is paid for with a credit card, that is inserted into a credit card reader, or is stored on the glasses.

Operating a Self-Serve Store Checkout Machine with a Glasses Operation

Example of Self-Serve Checkout Machine Operation

When the user is close to the self-serve checkout machine, for instance, 10 meters, the checkout machine icon in midair, is activated, by gazing at the machine icon, which moves a cursor by following and locating at the gaze point, to contact the machine icon, and secondary input by the user, such as, moving their nose as a facial gesture input. The activated checkout machine icon activates, the displaying of the checkout machine's control panel, on the glasses' display.

The control panel for the checkout machine is displayed. The user gazes, and secondary inputs the start icon on the panel, and the start screen is displayed on the glasses. The user scans a can of soup on the checkout machine, the price of the soup is displayed, on the glasses.

The user gaze, and secondary inputs the checkout icon. The user inputs, how many plastic grocery bags they are purchasing. The user inputs 3 bags purchased. The bag amount is added to the purchase. The pay icon is gaze, and secondary inputted, and the items prices are totaled. The user is given a choice to pay with a credit card icon displayed on the glasses.

The user gaze, and secondary inputs the credit card icon, to pay with the credit card stored on the user's glasses. The gaze, and secondary inputted icon shows the user's credit card. The total is paid for, when the user's credit card is gaze, and secondary inputted. The user pays the total with the credit card stored, on the glasses, or with money taken from a debit credit card linked, to the user's checking account, on the glasses.

Alternative Embodiment Glasses Scanner

In an alternative embodiment the glasses have a laser, that scans the bar codes on the products, or a camera in the glasses, is used as a visual scanner. The glasses scans products like, cans of corn, milk cartons, and egg cartons. The visual scanner may scan product identifiers, that are or are similar to a Quick Response code QR code. The items scanned by the glasses are displayed on the glasses, with their associated price. The glasses communicate with a store computer wirelessly.

The control panel for the checkout machine is displayed. The user gaze, and secondary inputs the start icon on the panel, and the start screen is displayed on the glasses. The user scans a bottle of mustard on the glasses, the price of the mustard is displayed, on the glasses, with the price associated to the mustard description. The user gaze, and secondary inputs the checkout icon. The user inputs 2 bags purchased; whose price is added to the purchase amount. The pay icon is gaze, and secondary inputted, and the items price are totaled. The total is paid for, when a credit card icon is gaze, and secondary inputted. The user pays with their credit card, which is stored on the glasses.

Camera Checking that Items are Scanned

The items are scanned by the glasses, and are then moved to an area that is for scanned items. A store camera views the glasses, the scanned item, the scanned area, and views that the item placed in the scanned area, has been scanned by the glasses, this is to avoid an item being placed in the scanned area, that hasn't been scanned. An item placed in the scanned is that hasn't been scanned, will stop the scanning processes, and alert an employee to assist the user to remove the unscanned item from the scanned area, to continue the scanning of other products. The store camera, is connected to the store computer.

Additional Advantages of Eye Tracking in an Augmented Reality Headset

How Eye Tracking Works

The eye tracker sends out near infrared light. The light is reflected in the user's eyes. Those reflections are picked up by the eye tracker's cameras. Through filtering, and algorithms calculations the eye tracker knows where the user is looking.

The algorithms control the sensors, and the illuminators. Based on the sensor images they identify, and calculate the position of the eyes, where the user is looking, and the size of the pupils Augmented Reality AR overlays digital information on real-world elements. Augmented reality keeps the real world central but enhances it with other digital details, layering new strata of perception, and supplementing a user's reality or environment, such as sports scores on TV during a match.

Artificial information about the environment, and its objects can be overlaid on the real world. Some AR glasses are designed to project light directly into users' eyes to trick their brains into perceiving virtual objects as part of their surrounding environment Mixed Reality MR brings together real world and digital elements. In mixed reality, you interact with and manipulate both physical and virtual items and environments, using next-generation sensing and imaging technologies. Mixed Reality allows a user to see and immerse themselves in the world around them, even as they interact with a virtual environment using their own hands, all without ever removing their headset. It provides the ability to have one foot (or hand) in the real world, and the other in an imaginary place, breaking down basic concepts between real and imaginary, offering an experience that can change the way they game and work today.

Natural Targeting

To view an input icon, users will now only need to look in a direction or at an icon rather than physically motion their forehead towards the icon. This interaction is natural, intuitive and seamless because it so closely mimics real-life interaction.

Humanizing Technology

AR and eye tracker can create truly immersive and natural experiences. Entirely unique experiences while using gaze input build in repeat-use value for users.

Heightened Emotions

AR has the unique ability to tap into our basic human emotions in a way that will pull the user deeper into the AR or VR experience AR Head-mounted Display equipped with an eye tracker 'knows' a user's intentions because what a user looks at is a good approximation of what they think. Users convey many of their complex human emotions using their eyes, eye tracking provides an unprecedented way to bring the real and the unreal closer together.

CONCLUSIONS, RAMIFICATIONS AND SCOPE

From the preceding description, and drawings, it becomes apparent, that a user can use eye gaze, voice, or thought, to activate holographic input icons, in mid-air. The mr glasses have a computer which is connected to either, a microphone, finger gesture recognition sensor, facial gesture recognition sensor, or a brain wave sensor, with the displayed icons, created by the glasses.

The input icons may operate public devices, or functions in the headset, such as, an enter command, or devices outside of the headset, such as, an internet search by a webpage, or an elevator's operating control panel.

User gaze, and secondary inputs to activate displayed input icons, frees the user's hands, from needing to use them to input, the input icons. Freed hands allow the user, to do other things with their hands, such as, rest their hands, or steer a car. A wheel chair user can operate a public device, that may be out of reach, with the glasses. The user avoids touching possible bacteria, on physical input icons, by inputting with their eyes, brain, gestures, or sound, instead if their fingers.

Although the description above contains much specificity, these should not be construed as limiting the scope of the embodiments, but as merely providing illustrations, of some of the presently preferred embodiments.

The reader will see that at least one embodiment, of the eye tracker AR headset, which uses eye gaze, thought, or spoken words, or hand gesture, or facial gestures to activate displayed input icons, provides a more reliable, healthier and economical device, that can be used by persons of almost any age.

It is therefore intended that the following appended claims, be interpreted as including all such alterations, permutations, and equivalents as fall within the essence, and scope of the present device.

Although the embodiments of the eye tracker, microphone, or thought, or body recognition camera, AR headset, have been described in connection with various embodiments, it should be understood that various modifications, additions and alteration may be made to the embodiments, without departing from the spirit, and scope of the embodiments.

The invention claimed is:

1. An augmented reality glasses display input icons in mid air with the glasses having a user input device, comprising,
    the user input device is an eye tracker,
    the eye tracker is connected to the glasses,
    the eye tracker is positioned to view the eyes the user when the user wears the glasses,
    a second user input device is connected to the glasses,
    the second user input device detects a second user input,
    the glasses wirelessly connect to a device,
    the device has a plurality of operating functions that are different from each other,
    the icons are associated to the functions of the device,
    one of the icons displays a description of the operation of the device that the icon is associated to,
    activation of the description of the operation icon is associated to an activation of the operation of the device that the icon describes,
    a detection of gaze at the icon is associated to a visual change in the icon detected being gazed at,
    the visually changed icon is activated with a detection of a secondary user input the activation of the described operation effects the operation of the device,
    wherein the device is a self-driving car,
    wherein the displayed description of the icon is a start movement of the self-driving car.

2. The glasses of claim 1, further including the effect of the activation of the described operation of the device is displayed on the display.

3. The glasses of claim 1, further including a cursor is displayed,
    the displayed cursor occupies the same location as the location of the detected gaze on the display.

4. The glasses of claim 1, wherein the device is a fast-food restaurant menu,
    the displayed description of the icon is a food item on the fast-food restaurant menu.

5. The glasses of claim 1, wherein the device is a smart toilet, the displayed description of the icon is a wash operation of the smart toilet.

6. The glasses of claim 1, wherein the device is an elevator,
    the displayed description of the icon is a floor number for the elevator to move to.

7. The glasses of claim 1, wherein the device is a vehicle energy delivery device,
    the displayed description is an amount of energy delivered to a vehicle.

8. The glasses of claim 1, wherein the secondary user input device is a microphone,
    the microphone is positioned to detect a sound made by the user,
    a detection of a specific sound by the user is associated to a detection of the secondary user input.

9. The glasses of claim 1, wherein the secondary user input device is a brain wave sensor,
    the brain wave sensor is positioned to detect a brain wave made by the user,
    a detection of a specific brain wave by the user is associated to a detection of the secondary user input.

10. The glasses of claim 1, wherein the secondary user input device is a finger gesture recognition sensor,
    the finger gesture recognition sensor is positioned to detect a finger gesture made by the user,
    a detection of a specific finger gesture by the user is associated to a detection of the secondary user input.

11. The glasses of claim 1, wherein the secondary user input device is a facial gesture recognition sensor,
    the facial gesture recognition sensor is positioned to detect a facial gesture made by the user,
    a detection of a specific facial gesture by the user is associated to a detection of the secondary user input.

12. A method for displaying input icons in mid air with mixed reality glasses, comprising,
    detecting an eye gaze location at one of the icons with an eye gaze sensor connected to the glasses,
    displaying a cursor at the detected gaze location,
    detecting a second user input by a second user input detector connected to the glasses,
    activating one of the icons with the cursor in contact with the icon and detection of the secondary user input,
    connecting the glasses wirelessly to a multi user device,
    associating the activation of one of the icon to activating one of a plurality of operations of the device,
    describing the operation of the device that one of the icons is associated to,
    effecting the operation of the device with the activated operation of the device, displaying feedback of the activated operation of the device,
    having the device be a self-driving car,
    having one of the displayed descriptions of the icons be a start movement of the self-driving car.

13. The method of claim 12, wherein the secondary user input device is a microphone,
    the microphone is positioned to detect a sound made by the user, a detection of a specific sound by the user is associated to a detection of the secondary user input.

14. The method of claim 12, wherein the secondary user input device is a brain wave sensor,
   the brain wave sensor is positioned to detect a brain wave made by the user,
   a detection of a specific brain wave by the user is associated to a detection of the secondary user input.

15. The method of claim 12, wherein the device is an automatic teller machine,
   the displayed description of the icon is one of the operations of the automatic teller machine,
   wherein the secondary user input device is a finger gesture recognition sensor, the finger gesture recognition sensor is positioned to detect a finger gesture made by the user,
   a detection of a finger gesture by the user is associated to a detection of the secondary user input.

16. The method of claim 12, wherein the secondary user input device is a facial gesture recognition sensor,
   the facial gesture recognition sensor is positioned to detect a facial gesture made by the user,
   a detection of a facial gesture by the user is associated to a detection of the secondary user input.

17. The method of claim 12, wherein the wireless connection is a wireless connection through an internet.

18. The method of claim 12, further providing connecting the glasses wirelessly to a plurality of multi user devices,
   wherein one of the device is a door opener,
   the displayed description of the icon is a door opening of the door opener,
   wherein one of the devices is a self serve check out station, the displayed description of the icon is a finish operation of the self serve check out station,
   wherein on of the devices is a vending machine, the displayed description of the icon is a drink delivery of the vending machine,
   wherein one of the devices is a hydrogen vehicle hydrogen delivery device,
   the displayed description is an amount of hydrogen delivered to a hydrogen vehicle.

19. The method of claim 12, wherein the device is a virtual document and a virtual keyboard that are displayed,
   the displayed description of the icon is a space key of the keyboard to input a space into text into the document.

* * * * *